(12) United States Patent
Liang et al.

(10) Patent No.: US 8,539,440 B1
(45) Date of Patent: Sep. 17, 2013

(54) INTERACTIVELY DESIGNING A HARDWARE IMPLEMENTATION OF A GRAPHICAL PROGRAM

(75) Inventors: Tianming Liang, Shanghai (CN); Kosta Ilic, Austin, TX (US); Jonathan Hawks, Cedar Park, TX (US); Ariane Chan-You, Austin, TX (US); Gerardo Garcia, Round Rock, TX (US); Lei Song, Shanghai (CN)

(73) Assignee: National Instruments Corporation, Austin, TX (US)

( * ) Notice: Subject to any disclaimer, the term of this patent is extended or adjusted under 35 U.S.C. 154(b) by 2 days.

(21) Appl. No.: 13/424,040

(22) Filed: Mar. 19, 2012

(51) Int. Cl.
*G06F 9/44* (2006.01)

(52) U.S. Cl.
USPC .......................... 717/105; 717/109; 715/763

(58) Field of Classification Search
None
See application file for complete search history.

(56) References Cited

U.S. PATENT DOCUMENTS

| | | | |
|---|---|---|---|
| 6,086,629 A | 7/2000 | McGettigan et al. | |
| 6,691,301 B2 | 2/2004 | Bowen | |
| 7,636,894 B2* | 12/2009 | Vedula et al. | 715/763 |
| 7,689,970 B1* | 3/2010 | Englehart et al. | 717/109 |
| 7,725,877 B2* | 5/2010 | Andrade et al. | 717/110 |
| 7,975,233 B2* | 7/2011 | Macklem et al. | 715/763 |
| 8,099,712 B2* | 1/2012 | Kodosky et al. | 717/109 |
| 8,135,570 B2 | 3/2012 | Linebarger et al. | |
| 8,185,833 B2* | 5/2012 | Kodosky et al. | 715/763 |
| 8,352,608 B1* | 1/2013 | Keagy et al. | 709/226 |
| 2006/0053407 A1* | 3/2006 | Kodosky et al. | 717/105 |
| 2010/0332912 A1* | 12/2010 | Eide et al. | 714/46 |
| 2011/0088011 A1* | 4/2011 | Ouali | 717/105 |
| 2012/0174058 A1* | 7/2012 | Winkler et al. | 717/105 |
| 2012/0174060 A1* | 7/2012 | Rivkin | 717/105 |

OTHER PUBLICATIONS

Balasubramanian et al., "Developing Applications Using Model-Driven Design Environments", IEEE Computer Society, Feb. 2006, pp. 33-40.*
Schmidt et al., "Model-Driven Engineering", IEEE Computer, Feb. 2006 (vol. 39, No. 2), pp. 25-31.*
Porter et al., "Towards Model-Based Integration of Tools and Techniques for Embedded Control System Design, Verification, and Implementation", M.R.V. Chaudron (Ed.): MODELS 2008 Workshops, LNCS 5421, pp. 20-34, 2009.*
Pederson et al.; "An FPGA Implementation of Bene Permutation Networks;" Technical Report DU-CS-03-06, Department of Computer Science, Drexel University, Philadelphia, PA, 2003; pp. 1-13.
Parker et al.; "Using Design Directives in a Schematic Document;" Confluence, first added Sep. 26, 2008, retrieved Dec. 7, 2012 from <http://wiki.altium.com/display/ADOH/Using+Design+Directives+in+a+Schematic+Document>; pp. 1-24.

* cited by examiner

*Primary Examiner* — Thuy Dao
*Assistant Examiner* — Stephen Berman
(74) *Attorney, Agent, or Firm* — Meyertons Hood Kivlin Kowert & Goetzel, P.C.; Jeffrey C. Hood; Mark S. Williams

(57) ABSTRACT

System and method for managing and specifying hardware implementation of a graphical program. A graphical program that implements an algorithm is stored in a memory of a computer system. The graphical program meets one or more first specified implementation requirements and is targeted for deployment to a programmable hardware element. A plurality of sets of descriptive directives are also stored in the memory, where the descriptive directives are associated with the graphical program and specify one or more additional specified implementation requirements, e.g., memory resource implementations, optimization directives, and so forth, where the additional directives result from programmatic and/or user-specification. Each set of descriptive directives is useable by a synthesis tool to generate a respective hardware configuration program for deployment to the graphical programmable hardware element.

23 Claims, 25 Drawing Sheets

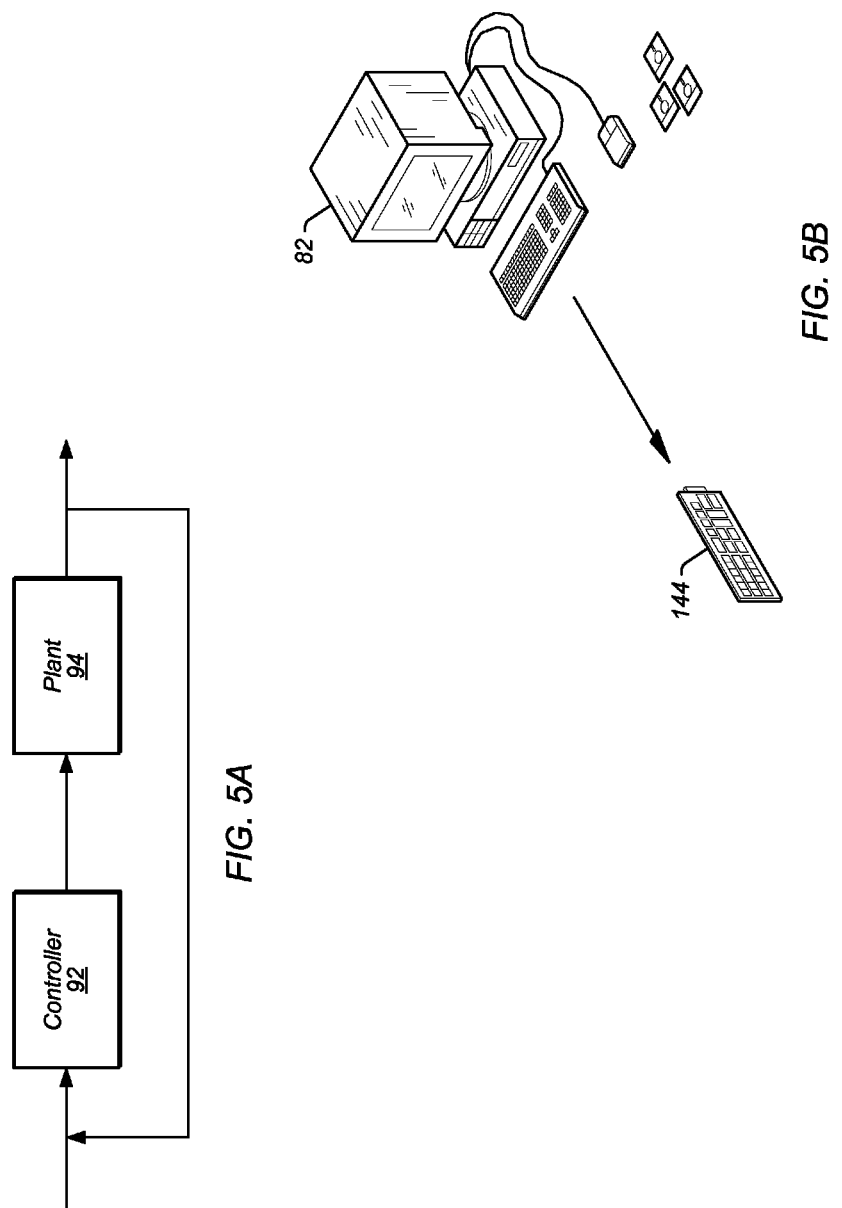

Top-level VI

| Directives | Value |
|---|---|
| ☑ Clock rate (MHz) | 40.00 |
| ☐ Share multipliers | |
| ☐ Pipeline initiation interval | |
| ☐ Minimum latency | |
| ☐ Maximum latency | |
| ☐ Inline subVIs | |
| ☐ Inline recursively | | subVI

| Directives | Value |
|---|---|
| ☐ Pipeline initiation interval | |
| ☐ Minimum latency | |
| ☐ Maximum latency | |
| ☐ Inline subVIs | |
| ☐ Inline recursively | |
| ☐ Inline self | |
| ☐ Inline off | |

For-Loop

| Directives | Value |
|---|---|
| ☐ Unroll factor | |
| ☐ Pipeline initiation interval | |
| ☐ Rewind | |
| ☐ Minimum latency | ☐ |
| ☐ Maximum latency | |
| ☐ Minimum iteration count | ☐ |
| ☐ Average iteration count | ☐ |
| ☐ Maximum iteration count | |

Multiply

| Directives | Value |
|---|---|
| ☐ Number of pipeline stages | |

Top-level Interface

| Directives | Value |
|---|---|
| ▶☐ scalar out | Registered data |
| ▶☐ cluster out | Data |
| ▶☐ All elements out[5] | All elements |
| ▶☐ Element-by-element out[5] | FIFO |
| ☐▶ scalar in | Parameter |
| ☐▶ cluster in | Registered data |
| ☐▶ All elements in[5] | All registered elements |
| ☐▶ Element-by-element in[5] | Memory |

Array

| Directives | Value |
|---|---|
| ☐ Partition type | |
| ☐ Number of partitions | |
| ☐ Resource | ☐ |
| ☐ Reshape type | ☐ |
| ☐ Reshape factor | |

*FIG. 9*

| Type | Requested | Estimated |
|---|---|---|
| TransferFunction.vi (Top-level VI) | | |
| Clock rate (MHz) | 40.00 | 42.11 |
| Initiation interval (cycles) | | 267 |
| Minimum latency | | 5 |
| Average latency | | 72 |
| Maximum latency | | 266 |
| For Loop | | |
| Number of iterations | | 1 ~ 255 |
| Latency | 1 | 6 ~ 260 |
| Initiation interval (cycles) | | 1 |
| Pipeline depth | | 6 |

INTERACTIVELY DESIGNING A HARDWARE IMPLEMENTATION OF A GRAPHICAL PROGRAM

FIELD OF THE INVENTION

The present invention relates to the field of graphical programming, and more particularly to specifying hardware implementations of graphical programs targeted for deployment to programmable hardware elements.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Increasingly, programming tools provide users with the ability to develop high level software, such as graphical programs, which can then be converted into hardware level instrument functionality, e.g., via generation of a hardware configuration program (which may be referred to as "IP", or Intellectual Property, as is well known in the art) used to configure a programmable hardware element (such as a Field Programmable Gate Array (FPGA)), thereby providing the user with the dual benefits of being able to program instrument functionality at the highest level possible (text-based or graphical programs), while also providing the ability to have the created program operate directly in hardware for increased speed and efficiency. Further information regarding such conversion may be found in U.S. Pat. No. 6,219,628 to Kodosky, et al., titled "System And Method For Configuring An Instrument To Perform Measurement Functions Utilizing Conversion Of Graphical Programs Into Hardware Implementations".

However, there are numerous aspects of hardware implementations that generally need to be specified to achieve design objectives, e.g., regarding performance, resource utilization, and so forth. Such specification by a user is complex, tedious, and error prone, and can lead to multiple divergent versions whose maintenance can be problematic.

For example, one big challenge for the algorithm designer, e.g., the designer/developer of a graphical program, is to generate different implementations for different requirements and specifications. For example, a fixed-point FIR (Finite Impulse Response) filter may be as simple as the graphical program of FIG. 1A in the designer's mind.

As may be seen, this exemplary graphical program specifies the high-level functionality of the filter, but is agnostic regarding hardware implementation. However, if the implementation on the programmable hardware element needs to achieve a fast throughput, e.g., 1 cycle/sample, the algorithm (graphical program) designer may have to re-implement the filter, i.e., redesign the graphical program. An example of such a redesigned graphical program is shown in FIG. 1B, in which iterative use of a few simple graphical program elements has been replaced by staged processing by a larger number of such elements. Such a design would thus require utilization of more resources on the programmable hardware element, thus exchanging a greater footprint for increased performance.

Now, following this progression, if there were one more request or requirement to make the hardware implementation execute at 160 MHz (or at least make this performance very likely), the designer may have to insert more registers into the design, e.g., resulting in the further redesigned graphical program of FIG. 1C.

As may be seen, in this version of the graphical program, even more elements have been added to increase the throughput of the program, thereby increasing hardware resource utilization to achieve higher performance.

Thus, in this exemplary case, the algorithm designer is required to maintain many different versions of the graphical program for the same relatively simple algorithm, which introduces the problems and complications of maintaining and managing the different designs.

As another example of hardware implementation issues confronting an algorithm designer, high-level synthesis tools for textual language programs are based on text variable names; however, in graphical programming languages, such as the "G" language of the LabVIEW™ graphical program development environment provided by National Instruments Corporation, each function, structure, data type, etc., is represented as a node in a graphical picture. Thus, there is a barrier for designers of graphical programs targeted for hardware implementation, such as users of LabVIEW FPGA™, also provided by National Instruments Corporation, to take advantage of high-level synthesis tools to design their hardware implementation(s). Currently, for example, if the users need to maintain a text format relationship between a LabVIEW FPGA diagram (graphical program) and the high-level synthesis tool, they may need to develop a complicated script, such as shown below.

```
<VI name="DirectFormFIR.vi">
    <VIPath>D:\GATIApp\DirectFormFIR\DirectFormFIR.vi</VIPath>
    <GObject name="ID_3_TopLevelDiagram">
        <TopClockRate>120.00</TopClockRate>
    </GObject>
    <Terminal name="ID_353">
        <IsIndicator>TRUE</IsIndicator>
        <TermType>Data</TermType>
    </Terminal>
    <Terminal name="ID_274">
        <IsIndicator>FALSE</IsIndicator>
        <TermType>Registered data</TermType>
    </Terminal>
    <GObject name="ID_446_Array">
        <ArrayPartitionType>Cyclic</ArrayPartitionType>
        <ArrayPartitionFactor>7</ArrayPartitionFactor>
        <ArrayResource>SPROMD</ArrayResource>
    </GObject>
    <GObject name="ID_43_For Loop">
        <LoopUnrollFactor>7</LoopUnrollFactor>
        <LoopII>1</LoopII>
    </GObject>
</VI>
```

Note that use of textual identifiers (IDs) is not intuitive for LabVIEW FPGA users and thus may be difficult to maintain.

A further example of hardware implementation issues relates to memory resource utilization of programmable hardware by graphical programs deployed to programmable hardware elements. Various data structures, such as arrays and clusters (heterogeneous data structures) have been widely used in graphical programs targeted for execution on processor-based computer systems, such as VIs (Virtual Instruments) developed in LabVIEW. A typical case handling array is shown in FIG. 2A.

In this exemplary graphical program, an input array is received as input to two different graphical program nodes, node A and node B, resulting in output of two modified arrays in which the value of a particular array element (in this case, element zero by default) has been replaced with the values 7 and −9, respectively. As indicated in FIG. 2A by the circled indicator on each the two nodes, buffers (memory resources) are created for the arrays. However, implementation of arrays on programmable hardware, such as an FPGA, is very resource-consuming, especially when the size of array is large. Now, one can use memory on the FPGA, e.g., implemented via gates or a fixed hardware resource (e.g., block RAM) on the FPGA, or a fixed hardware resource (e.g., DRAM) coupled to the FPGA (or more generally, the programmable hardware element), for an array, but currently, one must modify the original graphical program (which may be referred to as a diagram) to explicitly use specific corresponding nodes in the diagram to read from and write to memory, examples of which are shown in FIG. 2B.

With prior art approaches, e.g., using LabVIEW FPGA™, the developer generally has two options to program with arrays, both of which have their drawbacks.

1. Directly use an array data type in the graphical program (VI), as indicated by the three typed data terminals of FIG. 2A. In this particular case, LabVIEW FPGA™ will use registers (e.g., implemented with gates of the FPGA) to store all the arrays and buffers on the diagram. However, if several large arrays are used in the design, the algorithm VI (graphical program) will likely fail to compile, even when block memories (fixed memory resources) available on the FPGA remain unused.

2. Rewrite the code to specify use of onboard (fixed) memory for arrays, per FIG. 2B. However, this is a time-consuming task as the designer is required to handle arrays and buffers himself. Additionally, the modified algorithm VI (graphical program) becomes difficult to maintain.

SUMMARY OF THE INVENTION

Various embodiments of a system and method for specifying and managing hardware implementations of a graphical program are presented below.

In one embodiment, a graphical program may be stored on a computer system. The graphical program may thus comprise a plurality of interconnected nodes or icons which visually indicates the functionality of the program. The graphical program may be created either by the user or programmatically, as desired, and may implement a measurement function that is desired to be performed by the instrument.

The graphical program may meet or satisfy one or more first specified implementation requirements, and may be targeted for deployment to a programmable hardware element. In other words, the graphical program may be targeted for implementation on a programmable hardware element, such as one or more FPGAs (or other types of programmable hardware). In some embodiments, the graphical program may be a graphical data flow program. A plurality of sets of descriptive directives may be stored in the memory (of the computer system). The plurality of sets of descriptive directives may be associated with the graphical program, and each set of descriptive directives may specify one or more additional specified implementation requirements. Each set of descriptive directives may be useable by a synthesis tool (such as a third party high-level synthesis tool as provided by Xilinx, Inc.) to generate a respective hardware configuration program for deployment to the graphical programmable hardware element.

Thus, depending on the particular requirements for a hardware implementation of the graphical program, an appropriate set of directives may be readily available to the synthesis tool to generate the appropriate hardware configuration program for deployment to (configuration of) the programmable hardware element.

The first specified implementation requirements or the additional specified implementation requirements may include requirements in any of a variety of categories, including, for example (but not limited to), one or more of: top-level graphical program requirements, graphical subprogram (subVI) requirements, loop requirements, e.g., FOR or WHILE loop requirements, pipeline requirements for functions, e.g., for multiply, square root, etc., array (or cluster) requirements, resource usage requirements, performance requirements, or interface requirements, among others, with corresponding categories of directives, e.g., top-level graphical program (e.g., VI) directives, graphical subprogram (subVI) directives, loop e.g., FOR or WHILE loops, directives, pipeline directives for functions, e.g., for multiply, square root, etc. array (or cluster) directives, resource usage directives performance directives, interface directives, and so forth. In other words, requirements in the various categories may be specified by directives under the same (or similar) categories.

In one embodiment, the plurality of sets of descriptive directives may be stored with the graphical program, e.g., in a project file for the graphical program, in a common directory with the project file or even in the graphical program itself. In another embodiment, the sets of descriptive directives may be stored with the project file. Additionally, or alternatively, the stored set(s) of directives (or any portion thereof) may include a reference to the graphical program or project file whereby the graphical program or project file may be determined or accessed.

However, some users may not be familiar with the targeted hardware (e.g., FPGA) or even with the algorithm (per the graphical program). They may feel overwhelmed and frustrated to have to choose from these items and directives. Additionally, they may only want to prototype the algorithm with reasonable performance on an FPGA quickly, rather than be buried in the process of selecting directives. Accordingly, in one embodiment, the plurality of sets of descriptive directives may include one or more suites of directives, wherein each suite of directives comprises multiple directives and specifies a respective level of optimization to be applied to the graphical program. In other words, groups of directives may be provided at a higher level of abstraction so that users can easily set at least some of the directives without knowing the details of the implementation.

In some embodiments, descriptive names may be provided for each of the suites of directives, e.g., "Moderate throughput with moderate resource savings" (Optimization level 1), "High throughput" (Optimization level 2), "Very high throughput with larger footprint" (Optimization level 3), "Minimum footprint" (Optimization level 4), etc. Note that the above suites, names, and descriptions are exemplary only, and are not intended to limit the suites, directives, or names to any particular choices.

More generally, in some embodiments, each (or at least one) descriptive directive may textually indicate its meaning. For example, rather than using an obscure code (e.g., "D07") to represent a directive to unroll all loops, the directive may be signified by descriptive text, e.g., "unroll all loops", and so forth. In other words, a human reader may be able to tell the nature of the directive from its name or label.

In some embodiments, the method may include retrieving the graphical program and at least one of the one or more sets of descriptive directives in response to input. The graphical program and (one or more) sets of descriptive directives may then be provided to a synthesis tool to generate (one or more) respective hardware configuration programs. For example, the synthesis tool may be invoked to generate at least one respective hardware configuration program for deployment to the graphical programmable hardware element, based on the retrieved program and the at least one of the one or more sets of descriptive directives.

Moreover, in some embodiments, the method may further include deploying the at least one respective hardware configuration program to the graphical programmable hardware element. In other words, the generated (at least one) hardware configuration program may be used to configure (at least one) programmable hardware element, per the (at least one) set of descriptive directives, i.e., may include configuring the programmable hardware element with the hardware configuration program, which thereby deploys the graphical program (functionality) to the programmable hardware element.

In one embodiment, embodiments of method for interactively designing a hardware implementation of a graphical program may be provided. In some embodiments, the method elements presented below may be performed by a graphical user interface (GUI). In other words, a GUI may be provided for specifying implementation directives of a graphical program for deployment on a programmable hardware element, and may provide the functionality described below. Thus, in some embodiments, any of the method elements described may be performed by or via the GUI. This method may operate as follows.

First, user input indicating the graphical program may be received. For example, the user may provide a name and/or project file for the graphical program, possibly including a directory path. Alternatively, the user may select the graphical program (or project file) from a list, menu, or palette of graphical programs (or project files), e.g., via a pointing device, e.g., a mouse, touch pad/screen, etc., as desired.

The graphical program may be displayed (on a display device). As noted above, the graphical program may comprise a plurality of interconnected nodes that visually indicate functionality of the graphical program. Moreover, in some embodiments, the graphical program may include or be a graphical data flow program.

One or more nodes of the graphical program may be displayed, e.g., in the GUI. Each node of the one or more nodes may be configurable in accordance with a directive to generate a respective hardware implementation of the node. Thus, in one embodiment, only those nodes (or components) of the graphical program for whom directives may be specified may be displayed. Note that this display of nodes is preferably distinct from the display of the graphical program. For example, in one embodiment, the one or more nodes of the graphical program may be displayed in a tree diagram. Note further that as used herein, the term "node" may refer to any of various graphical program elements or components, including for example, but not limited to, arrays, clusters, or other data structure types, terminals, feedback nodes, constants, and in some cases, wires, and so forth.

One or more directives may be displayed, e.g., in the GUI. Each directive may specify one or more requirements for a hardware implementation of the graphical program. Moreover, each directive of the one or more directives may be selectable for application to a specific type of node in the graphical program.

Estimated results generated by a synthesis tool may then be displayed in accordance with a set of selected directives. In other words, whichever directives are selected (by a user or programmatically) may be used by a synthesis tool to generate estimates of results for the specified hardware implementation, e.g., via simulation, lookup tables, etc. The estimated results may include estimates of any of a variety of performance or resource (or other) metrics applicable to the graphical program/implementation, e.g., resource utilization, execution speed, throughput, latency, etc., as desired. For example, in one embodiment, the estimated results may include one or more of a summary of estimated results, estimated device utilization, or estimated performance, among others.

The set of selected directives may be stored in association with the graphical program. The graphical program and the selected set of directives may be useable by the synthesis tool to generate a hardware configuration program that is deployable to the programmable hardware element. The association between the graphical program and the set of selected directives may be implemented in any of a variety of ways, including the stored directives having a reference or link to a project file for the graphical program, e.g., possibly including a relative and/or absolute path to the graphical program. Any other means for associating the graphical program and the set of selected directives may be used as desired. As indicated above, in some embodiments, each directive may be or include a descriptive directive textually indicative of its meaning, i.e., instead of being represented with an obscure alphanumeric code which might not be meaningful to a user.

In a further embodiment, user input selecting a first node of the one or more nodes may be received (e.g., to or by the GUI), in response to which the selected first node may be highlighted. Directives applicable to the first node may then be displayed. Said another way, in response to user-selection of a node (from the displayed one or more nodes), the method (or GUI) may display all and only directives applicable to the first node. In this way, users may readily understand from which directives they can select for a given graphical program element. In another embodiment, in response to user-selection of a node (from the displayed one or more nodes), the method (or GUI) may not only highlight the node (in the display of the one or more nodes), but may highlight the selected first node in the display of the graphical program, thereby allowing the user to see exactly where in the graphical program the selected node is used, and thus, where the directive is to be applied.

The method may further include receiving user input selecting at least one directive for application to the first node of the one or more nodes, where the set of selected directives includes the at least one directive selected by the user. In other words, the user may select particular directives to apply to selected nodes (that are used in the graphical program). Similarly, as noted above, the method may display suites of directives selectable by the user for application to the graphical program (or select elements thereof), from which the user may select at least one suite. The set of selected directives may then also include any selected suites of directives.

Moreover, one or more of the above method elements may be performed multiple times to add further directives to the set of selected directives used to generate the estimated results. For example, in one embodiment, further user input selecting another node of the one or more nodes may be received. All and only directives applicable to the other node may then be displayed in response to the user input selecting the other node. Further user input selecting another at least one directive for application to the other node may also be received. The receiving further user input selecting another node, the displaying all and only directives applicable to the other node, the receiving further user input selecting another at least one directive for application to the other node, optionally, the displaying and selecting of further suites of directives, and the displaying of estimated results, may be repeated one or more times in an iterative manner. The set of selected directives then includes each of the other at least one directives (and/or suites) selected by the user.

In other words, the user may successively select nodes, see what directives may be applied to them, then select the directives to be applied, where these selected directives, along with any default directives (or suites) and selected suites, compose the set of selected directives stored for subsequent retrieval and application. As the user progressively selects these directives, the estimated results may be updated to reflect the current set of selected directives, which may then be taken into account by the user in selecting or modifying the directives stored as part of the set of selected directives. Of course, the method may further include receiving user input removing or modifying previously selected directives (or suites of directives), in which case the displayed estimated results may also be updated accordingly.

The estimated results may be presented in any of various ways. For example, in one embodiment, displaying the estimated results may include displaying applied directives that are related to respective ones of the estimated results. In other words, the display of the estimated results may indicate the applied directives under which the resulting estimates were made, e.g., per estimate. Similarly, in another embodiment, displaying the estimated results may include displaying nodes of the graphical program that are related to respective ones of the estimated results, i.e., the display of the estimated results may indicate the respective nodes that are germane to each estimated result.

In some embodiments, the GUI may allow the user to invoke the synthesis tool to generate the estimated results, in response to which the estimated results may be displayed in the GUI. Moreover, in one embodiment, the GUI may provide a option to verify timing, selection of which by the user may result in the GUI calling the synthesis tool (e.g., an integrated synthesis environment (ISE)) to provide solid device utilization and timing results from a compilation.

In some embodiments, the method may include storing the estimated results, e.g., possibly in association with the stored set of selected directives. Additionally, in some embodiments, the method may include storing an estimated results history, which may help the user track multiple estimation results from various sets or suites of directives applied to the graphical program. In other words, as the user interactively specifies the various directives and respective estimated results are generated, the method may keep track of these estimated results, along with the directives upon which the estimated results were based. The GUI may accordingly provide undo/redo functionality, whereby the user may backtrack or recapitulate previous selection/generation actions or sequences.

In one embodiment, the method (GUI) may provide means, e.g., a button, menu item, etc., that allows the user to import a previously saved set of directives, and to view/edit the directives and invoke performance estimation (generation of estimated results) via the GUI based on the imported directives.

Embodiments of a method for interactively specifying hardware implementation of memory for a graphical program may also be provided. First, a graphical program may be stored. The graphical program may be analyzed, thereby determining one or more memory resources used in the graphical program. In other words, the method may programmatically determine all memory uses in the graphical program, including both explicit and implicit memory allocations. In other words, embodiments of the method may analyze the graphical program and determine which graphical program elements (which may be referred to generally as "nodes" or "components") require memory resources, whether as an explicit data object (memory resource) or an internal (implicit) buffer. The node could be an instance of an array or cluster, a terminal, a wire, constants, a feedback node, etc. Note that not all instances may represent unique internal buffers; certain functions may force a copy of the memory resource used by the node to be made (therefore creating another unique buffer) while other functions might not need to make such a copy.

One or more nodes used in the graphical program that require memory resources may optionally be displayed. The one or more nodes may be displayed in any of a number of ways. For example, in one embodiment, displaying the one or more nodes used in the graphical program may include displaying an indication of each of the one or more memory resources proximate to a respective node of the one or more nodes used in the graphical program that requires the memory resource. In some embodiments, displaying the one or more nodes may include displaying the nodes in a tree diagram. For example, the tree diagram may display the nodes that use memory resources in a hierarchical manner, with the memory resource(s) used by each node displayed under the node, e.g., as a sub-item. In one embodiment, the method may include receiving user input selecting a first node of the one or more nodes, and highlighting the selected first node.

The graphical program may optionally be displayed, including displaying indicators on or proximate to each of the one or more nodes displayed in the graphical program that require memory resources. Said another way, nodes or components displayed in the graphical program that require memory resources may be indicated as such. The indicators can be of any type desired, e.g., simple graphical symbols, e.g., red dots, triangles, etc., highlighting of the nodes, or even descriptive labels, among others. In one embodiment, displaying the indicators includes displaying a first indicator corresponding to the selected first node in response to the user input selecting the first node (in the component display). In some embodiments, the user may select all of the components/resources (e.g., and the "Find on block diagram" option), and the graphical program display may then highlight all of the nodes with memory resource requirements.

A respective implementation may be specified for each of the one or more memory resources on the programmable hardware element, thereby generating configuration information. Note that this specification may be performed in response to user input, or programmatically (i.e., automatically, via software). In other words, in some embodiments, users can configure the memory resources, e.g., arrays and buffers, interactively, allowing users to control what kind of hardware resource is used for any specific memory resource, while in other embodiments, default selections may be used, or the selections may be made programmatically, e.g., based on heuristics, size of array, available resources, etc., an expert system, and so forth.

Thus, for example, in one embodiment, specifying a respective implementation for each of the one or more of the memory resources may include receiving first user input selecting a first memory resource of the at least one memory resource, in response to which a plurality of selectable implementation options for implementing the first memory resource may be displayed. Then, second user input may be received selecting a first implementation option from the plurality of implementation options for implementing the first memory resource. The method may analyze context or manner in which the memory resource is used in the graphical program (and possibly requirements or directives for the graphical program) and may programmatically narrow the options presented to the user based on this analysis. In other words, the implementation options presented to the user may be based on the use case or context of the memory resource.

In other embodiments, the method may automatically specify implementations for some or all of the memory resources used by the graphical program. For example, in some embodiments, specifying an implementation may include automatically (programmatically) selecting a default implementation option, where, it should be noted, the default implementation option can be overridden by user input. For example, in one embodiment, specifying an implementation may include analyzing the at least one memory resource and its use in the graphical program, and programmatically selecting at least one implementation option for the at least one memory resource, based on the analyzing (the at least one memory resource and its use in the graphical program). In some embodiments, the selected implementation option is or includes a directive for hardware implementation of the graphical program.

Thus, in some embodiments, the method may automatically select which type of memory (e.g., BRAM, DRAM, LUT, etc.) implemented for a node makes the most sense based on the usage pattern, size, or other factors. In one embodiment, if the user explicitly configures a memory resource to be implemented via a memory type that is not compatible with the usage of the node/memory resource, the method may generate (e.g., and display) an error, e.g., in a display, log file, etc.

In specifying memory resource implementations based on context/usage, the method may determine that one or more memory resources can be shared by nodes, and may specify implementation accordingly, e.g., via a respective directive, possibly overriding previous implementation specifications or directives. In various embodiments, this process may be performed as part of the specification step of the method, or as an optional further optimization step, discussed in more detail below.

Thus, whether with or without user input, configuration information specifying implementation of at least one memory resource for the graphical program may be generated.

The configuration information may be stored. The configuration information may then be useable to implement the (functionality of the) graphical program on the programmable hardware element. For example, the configuration information may be used by a synthesis tool to implement memory resources used by the graphical program on the programmable hardware element as specified by the configuration information. The configuration information and the graphical program may then be retrievable, e.g., in response to user input, for provision to a synthesis tool to generate a hardware configuration program for deployment to the programmable hardware element. In some embodiments, the configuration information may be stored with the directives for the graphical program, e.g., with in the project file (as further directives), although in other embodiments, the configuration information may be stored elsewhere as desired, e.g., with the graphical program itself. At least a portion of the configuration information may be displayed, thereby allowing the user to review the specified implementations of memory resources for the graphical program.

In some embodiments, the method may include further optimization of the graphical program. For example, in one embodiment, prior to the analysis of the graphical program to determine the one or more memory resources used in the graphical program, or after the implementation specification process, the method may perform one or more transformations, e.g., may apply one or more optimization transforms to the graphical program, e.g., may apply a chain of transforms, to optimize the graphical program. These transforms may include general compilation optimization transforms such as dead code/unused memory elimination and specific transforms for optimizing array implementations on the programmable hardware element (e.g., FPGA). Alternatively, or additionally, further optimization of the graphical program may be performed after specifying a respective implementation for each of the one or more memory resources. The further optimization may include specifying sharing of at least one of the memory resources between nodes in the graphical program, thereby reducing resources required for implementing memory resources on the programmable hardware element.

Thus, optimization of the graphical program may be performed before and/or after (or even during) the above analysis and specification processes.

In some embodiments, the method may further include receiving user input modifying the graphical program, e.g., based on viewing various results from the above process. For example, such editing of the graphical program may be formed after displaying at least a portion of the configuration information. After this modification of the graphical program, the above-described analyzing, specifying, and displaying, may be performed (e.g., again). Moreover, in some embodiments, the method may include repeating said modifying the graphical program, and said performing said analyzing, said specifying, and said displaying, one or more times in an iterative manner, thereby interactively optimizing resource utilization or performance on the programmable hardware element.

In embodiments that include displaying the graphical program after analyzing the graphical program (including displaying a respective indicator on or proximate to each node displayed in the graphical program that requires a memory resource), user input modifying the graphical program may be received after said displaying the graphical program, and the analyzing, specifying, and displaying, may be performed after said modifying. Additionally, this modifying the graphical program, and performing said analyzing, said specifying, and said displaying, may be repeated one or more times in an iterative manner, thereby interactively optimizing resource utilization or performance on the programmable hardware element.

Similarly, in embodiments that include displaying one or more nodes used in the graphical program that require memory resources, including displaying an indication of each of the one or more memory resources proximate to a respective node of the one or more nodes used in the graphical program that requires the memory resource, user input may be received modifying the graphical program after displaying the one or more nodes and said displaying the graphical program, and the analyzing, specifying, and displaying the one or more nodes, may be performed after such modifying. Moreover, the modifying the graphical program, and performing of the analyzing, specifying, and displaying, may be repeated one or more times in an iterative manner, thereby interactively optimizing resource utilization or performance on the programmable hardware element.

Thus, in some embodiments, the method may include iterative and interactive specification and optimization of the graphical program, particularly regarding the implementation specification of memory resources.

Thus, various embodiments of the above techniques may facilitate optimization of the hardware implementation of graphical programs, possibly via interactions with the user.

Thus, various techniques for specifying, managing, and deploying hardware implementations of a graphical program are provided.

BRIEF DESCRIPTION OF THE DRAWINGS

A better understanding of the present invention can be obtained when the following detailed description of the preferred embodiment is considered in conjunction with the following drawings, in which:

FIG. 5A is a high level block diagram of an exemplary system which may execute or utilize graphical programs;

FIG. 5B illustrates an exemplary system which may perform control and/or simulation functions utilizing graphical programs;

FIG. 9 illustrates directives in various different categories, according to one embodiment;

Figure 1A:
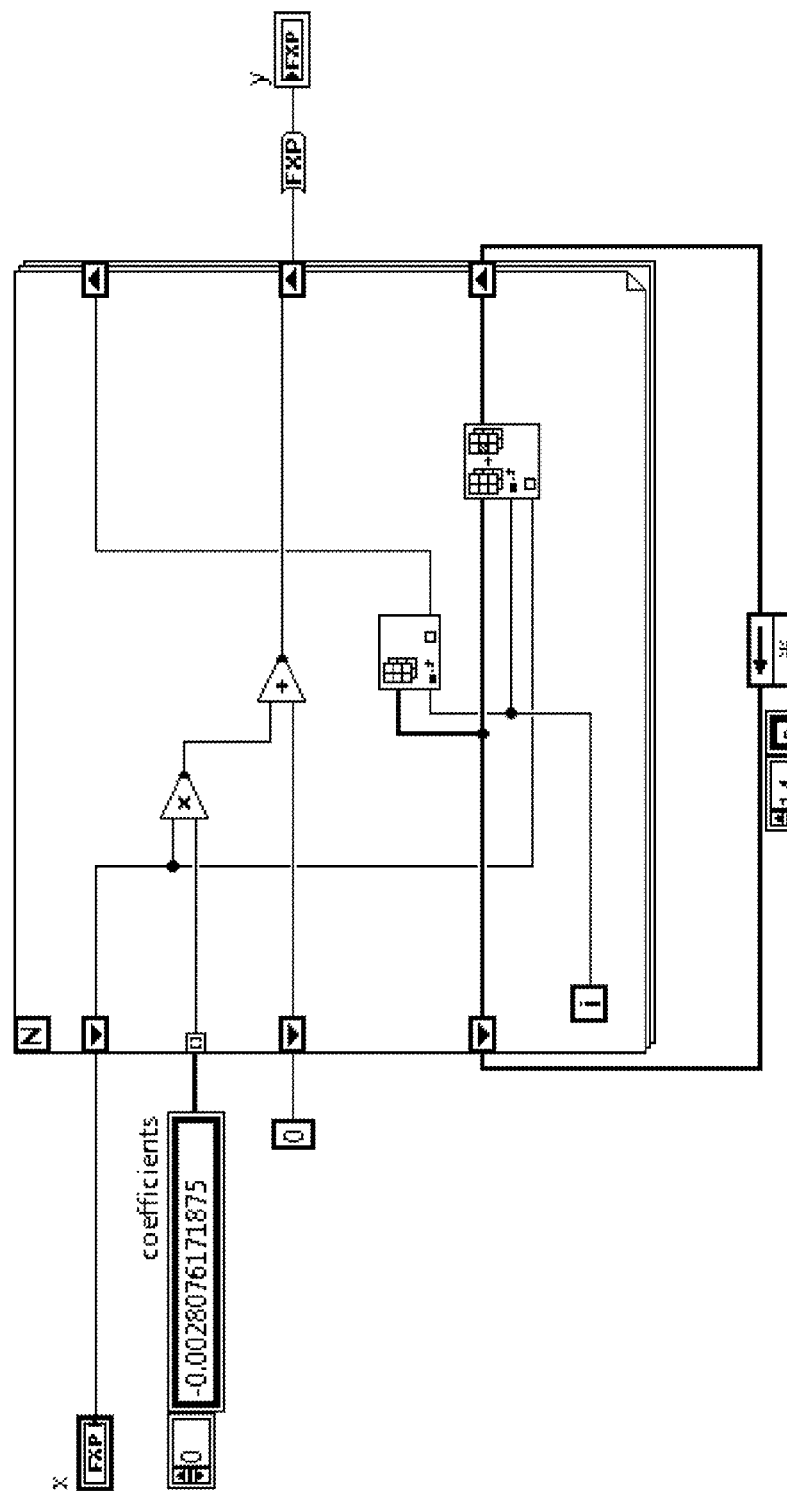
FIGS. 1A, 1B, and 1C illustrate respective versions of a graphical program implementing an FIR filter targeted for hardware implementation according to different requirements, according to the prior art.
Figure 1B:
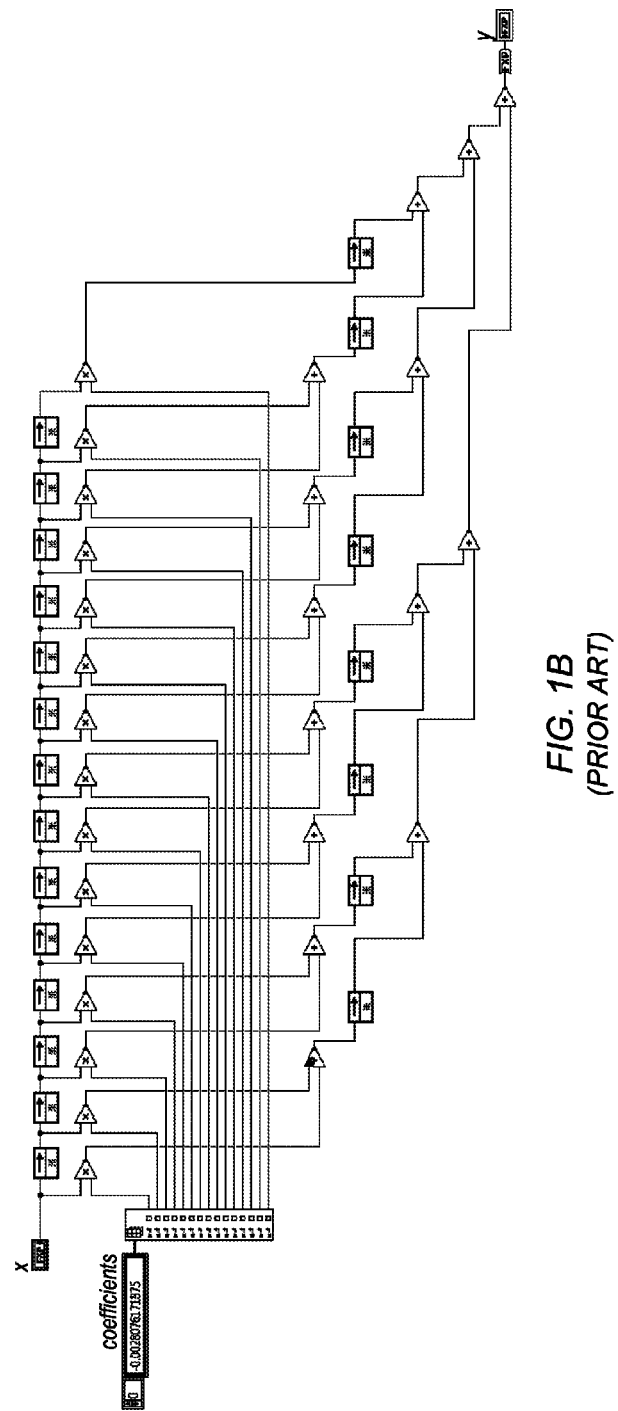
Figure 1C:
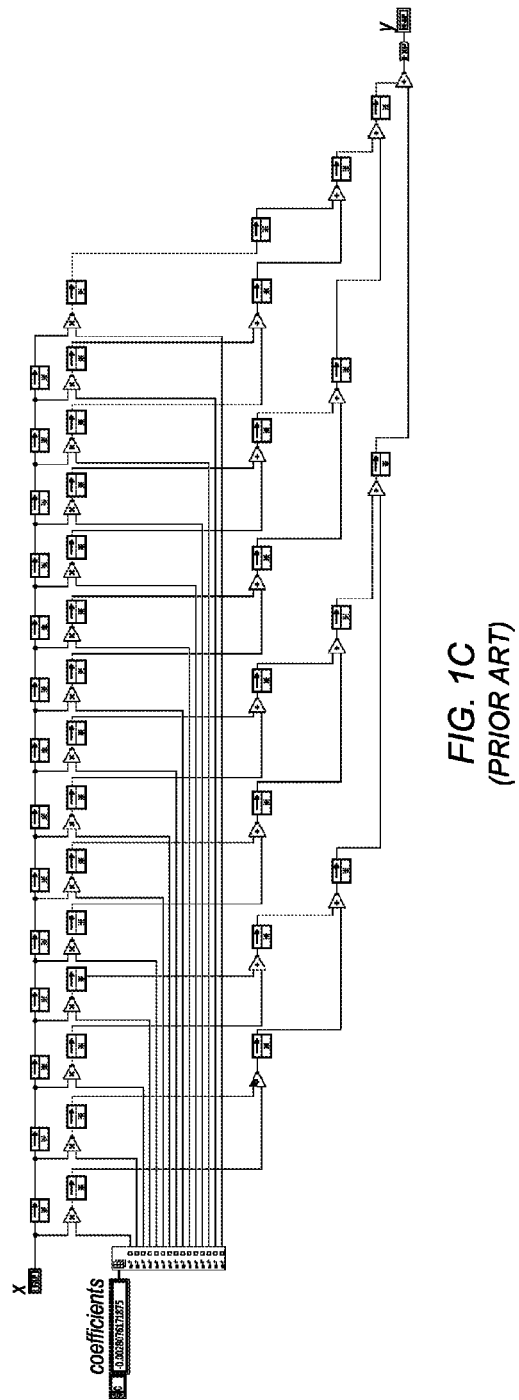
Figure 2A:
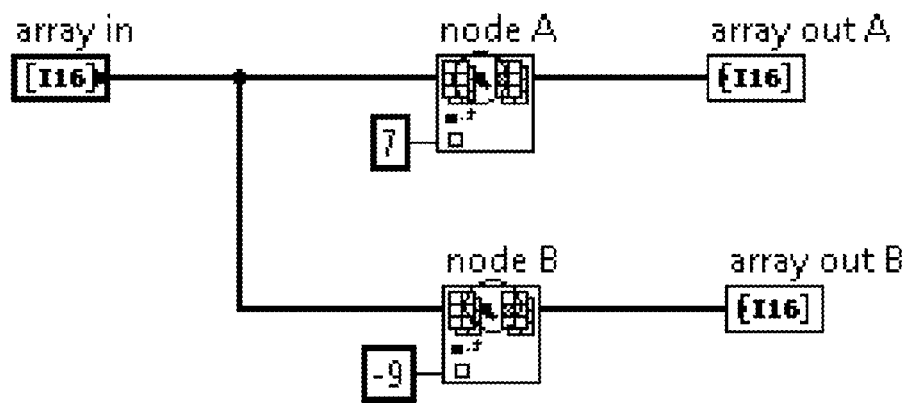
FIGS. 2A and 2B respectively illustrate a graphical program that utilizes arrays, and corresponding graphical program elements for accessing memory resources on a programmable hardware element, according to the prior art.
Figure 2B:
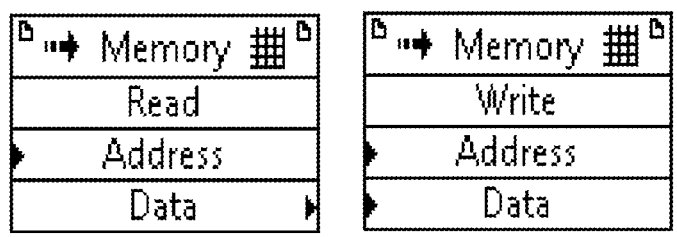

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 3A:
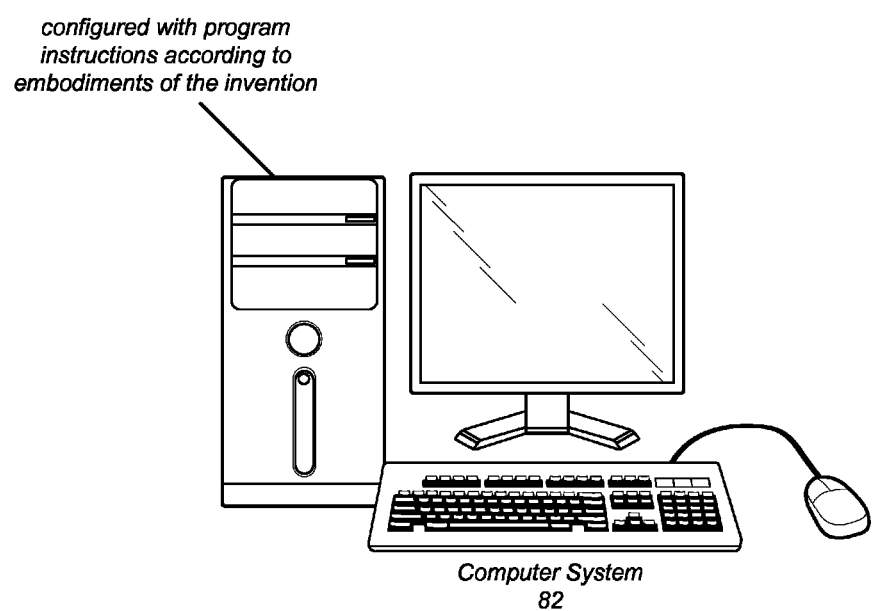
FIG. 3A illustrates a computer system configured to execute a graphical program according to an embodiment of the present invention.

FIG. 3A—Computer System

FIG. 3A illustrates a computer system 82 configured to implement embodiments of the invention.

As shown in FIG. 3A, the computer system 82 may include a display device configured to display the graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 3B:
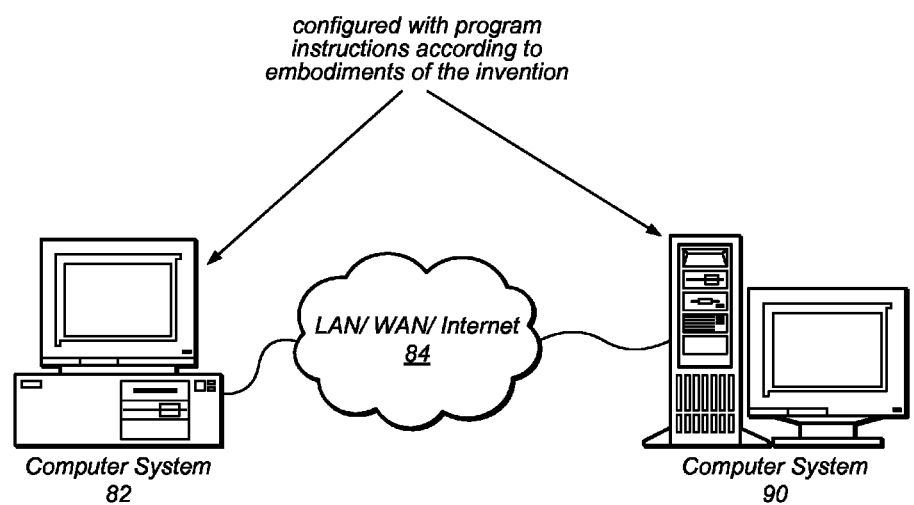
FIG. 3B illustrates a network system comprising two or more computer systems that may implement an embodiment of the present invention.

FIG. 3B—Computer Network

FIG. 3B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 4A:
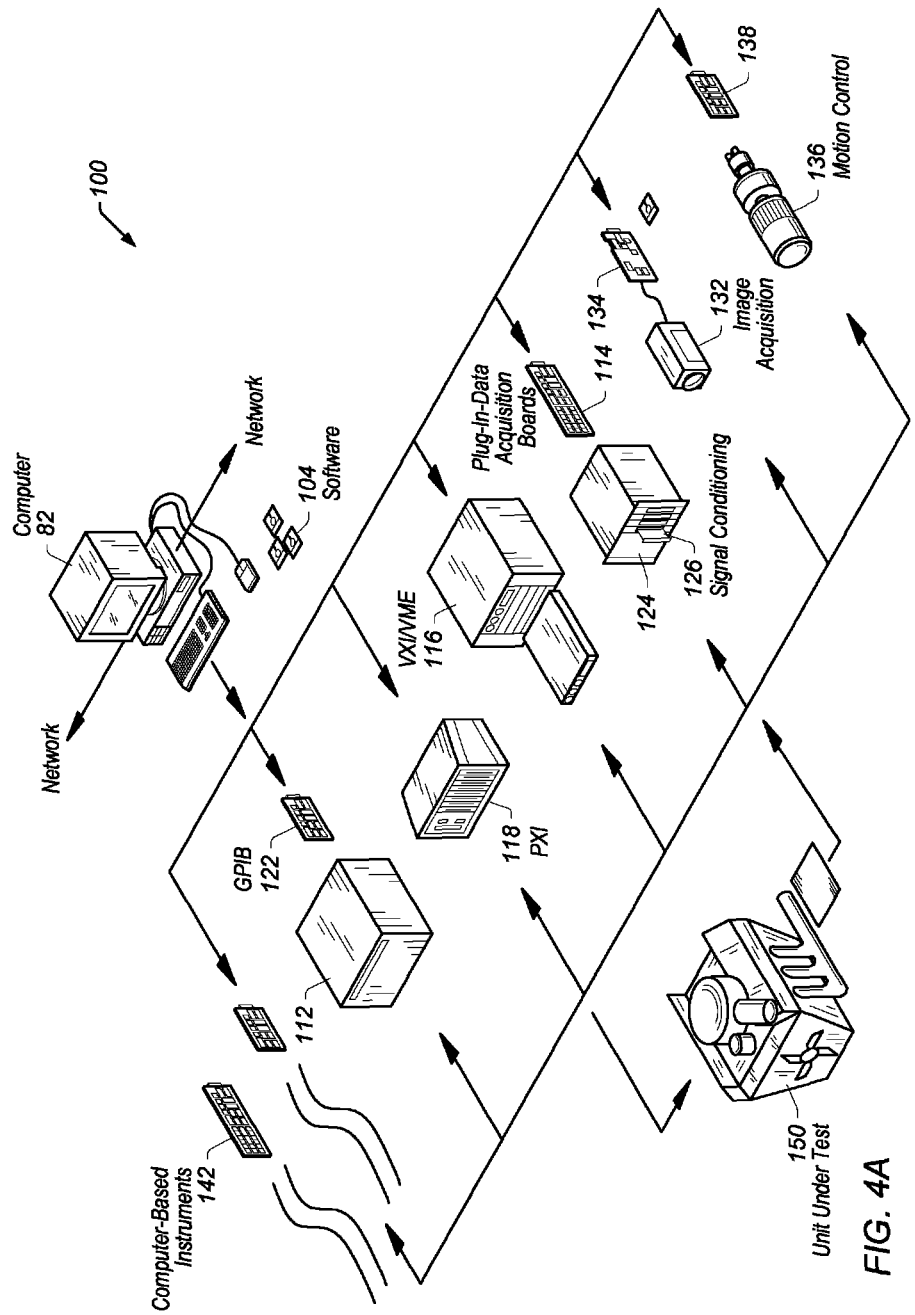
FIG. 4A illustrates an instrumentation control system according to one embodiment of the invention.

FIG. 4A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 4B:
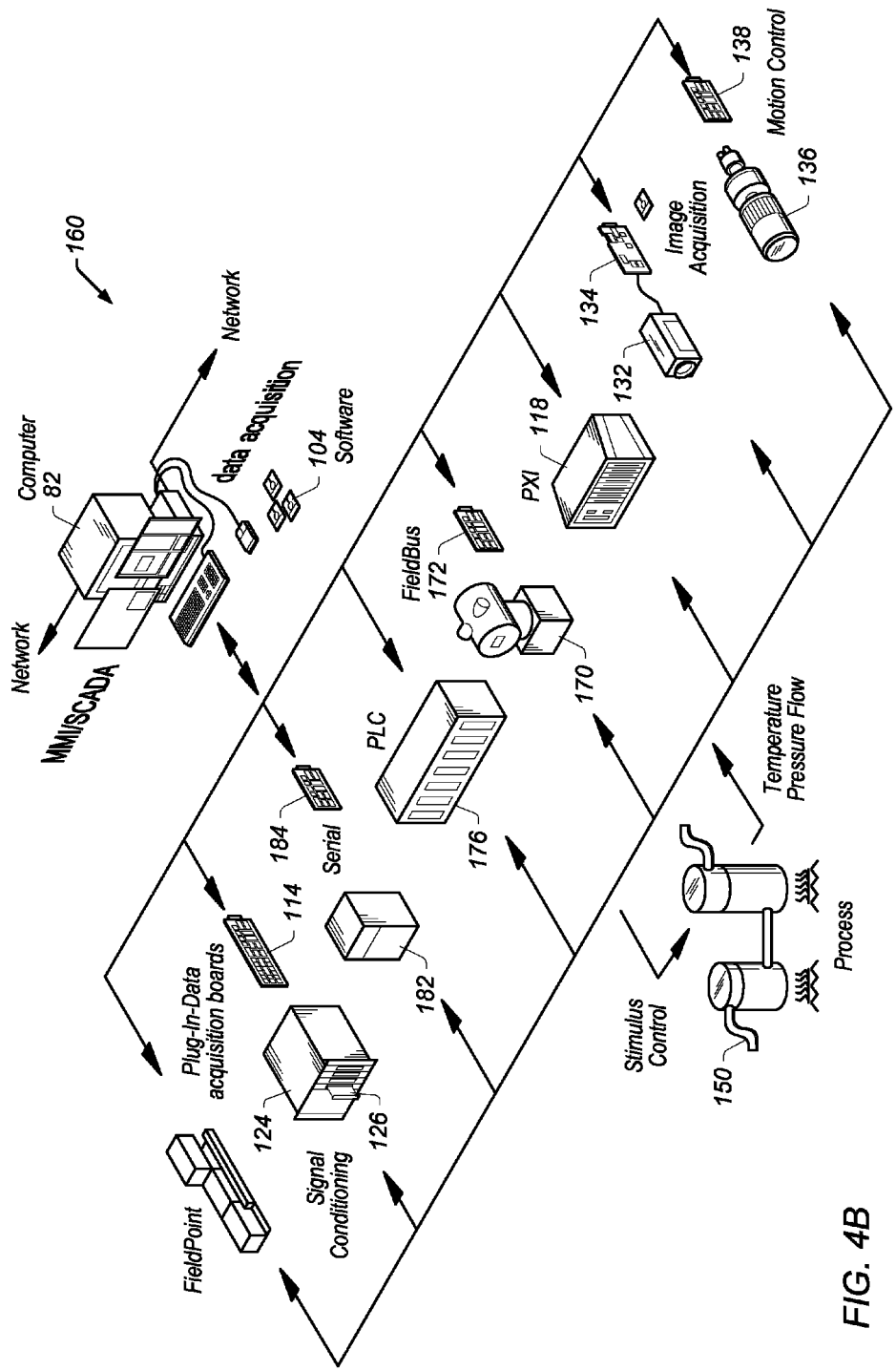
FIG. 4B illustrates an industrial automation system according to one embodiment of the invention.

FIG. 4B illustrates an exemplary industrial automation system 160 which may implement embodiments of the invention. The industrial automation system 160 is similar to the instrumentation or test and measurement system 100 shown in FIG. 4A. Elements which are similar or identical to elements in FIG. 4A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 5A is a high level block diagram of an exemplary system which may execute or utilize graphical programs. FIG. 5A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

FIG. 5B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 4A, 4B, and 5B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 4A and 4B, may be referred to as virtual instruments (VIs).

Figure 6:
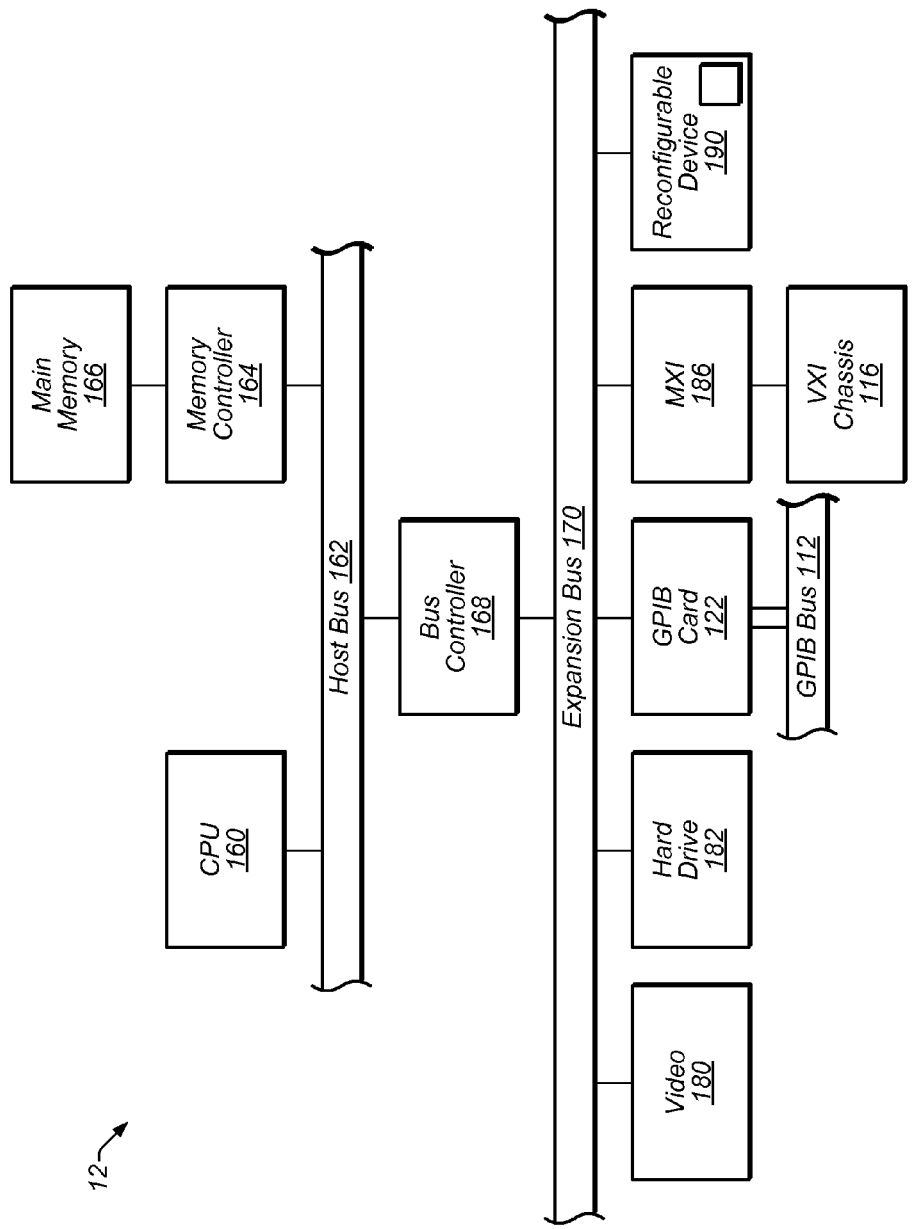
FIG. 6 is an exemplary block diagram of the computer systems of FIGS. 3A, 3B, 4A and 4B and 5B.

FIG. 6—Computer System Block Diagram

FIG. 6 is a block diagram representing one embodiment of the computer system 82 and/or 90 illustrated in FIGS. 3A and 3B, or computer system 82 shown in FIG. 4A or 4B. It is noted that any type of computer system configuration or architecture can be used as desired, and FIG. 6 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a graphical program, as well as software configured to implement embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 7:
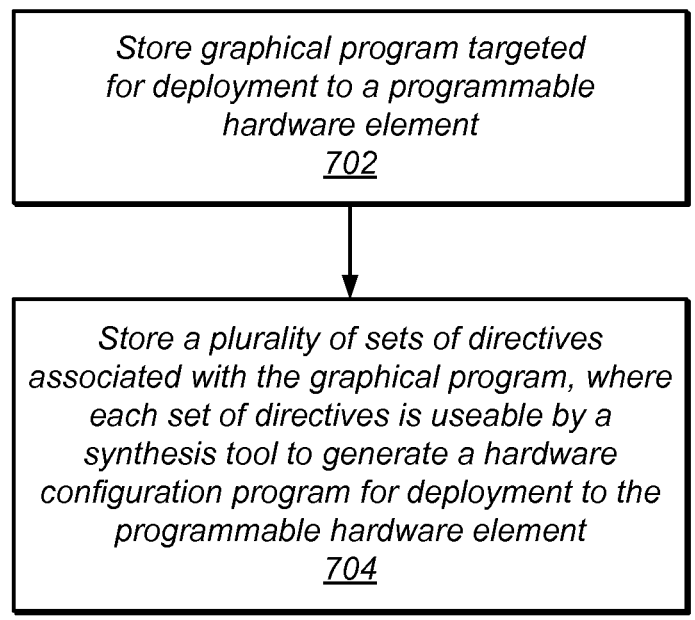
FIG. 7 is a flowchart diagram illustrating one embodiment of a method for managing hardware implementation and deployment of a graphical program.

FIG. 7—Flowchart of a Method for Managing Hardware Implementation and Deployment of a Graphical Program FIG. 7 illustrates a method for managing hardware implementation and deployment of a graphical program, according to one embodiment. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 702 a graphical program may be stored on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use a LabVIEW graphical programming development environment to create the graphical program.

In an alternate embodiment, the graphical program may be created in 702 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

The graphical program may meet or satisfy one or more first specified implementation requirements, and may be targeted for deployment to a programmable hardware element. In other words, the graphical program may be targeted for implementation on a programmable hardware element, such as one or more FPGAs (or other types of programmable hardware). As noted above, in some embodiments, the graphical program may be a graphical data flow program.

In 704, a plurality of sets of descriptive directives may be stored in the memory (of the computer system). The plurality of sets of descriptive directives may be associated with the graphical program, and each set of descriptive directives may specify one or more additional specified implementation requirements. Each set of descriptive directives may be useable by a synthesis tool (such as a third party high-level synthesis tool as provided by Xilinx, Inc.) to generate a respective hardware configuration program for deployment to the graphical programmable hardware element.

Thus, depending on the particular requirements for a hardware implementation of the graphical program, an appropriate set of directives may be readily available to the synthesis tool to generate the appropriate hardware configuration program for deployment to (configuration of) the programmable hardware element.

The first specified implementation requirements or the additional specified implementation requirements may include requirements in any of a variety of categories, including, for example (but not limited to), one or more of: top-level graphical program requirements, graphical subprogram (subVI) requirements, loop requirements, e.g., FOR or WHILE loop requirements, pipeline requirements for functions, e.g., for multiply, square root, etc., array (or cluster) requirements, resource usage requirements, performance requirements, or interface requirements, among others, with corresponding categories of directives, e.g., top-level graphical program (e.g., VI) directives, graphical subprogram (subVI) directives, loop e.g., FOR or WHILE loops, directives, pipeline directives for functions, e.g., for multiply, square root, etc. array (or cluster) directives, resource usage directives performance directives, interface directives, and so forth. In other words, requirements in the various categories may be specified by directives under the same (or similar) categories.

For example, if directives are classified according to node types to which directives can be applied: Exemplary top-level graphical program directives include, but are not limited to, clock rate (e.g., in MHz), share multipliers, initiation interval (cycles), minimum latency, maximum latency, inline subprograms (e.g., subVIs), and inline recursively. Exemplary subprogram (or subVI) directives include, but are not limited to, initiation interval (cycles), minimum latency, maximum latency, inline subprograms (e.g., subVIs), inline self, and inline off. Exemplary loop related directives include, but are not limited to, unroll factor, initiation interval (cycles), minimum latency, maximum latency, array, partition type, number of partitions, resource (e.g., implement via a specified resource type), multiply, and number of pipeline stages. Exemplary interface directives include, but are not limited to, data, all elements, element-by-element unbuffered, and element-by-element buffered.

Alternatively, if directives are classified according to the implementation effects of directives on hardware: Exemplary interface directives include, but are not limited to, data, all elements, element-by-element unbuffered, and element-by-element buffered. Exemplary directives related to speed of execution on hardware include, but are not limited to, clock rate (e.g., in MHz), initiation interval (cycles), minimum latency, maximum latency, and number of pipeline stages. Exemplary directives related to resource usage on hardware include, but are not limited to, share multipliers, inline subprograms (e.g., subVIs), inline recursively, inline self, inline off, unroll factor, partition type, number of partitions, and resource, which, in one embodiment, may have the following meanings:

Interface directives: describe how the hardware configuration program or IP that will be generated expects to get its inputs and outputs from the top-level entity (corresponding to the top-level graphical program or VI) or other entities. In some embodiments, these directives primarily apply to arrays. Exemplary interface directives include:
   Data—processes the data "as-is"; may only be available for scalars.
   All elements—reads all elements of array in one cycle and store elements in registers; the algorithm needs all elements to begin and will receive them all at the same time.
   Element-by-element, buffered—Reads one element at a time and stores them in memory; the algorithm needs all elements to begin but will receive them one at a time.
   Element-by-element, unbuffered—Reads one element at a time; the algorithm can begin when it receives the first element.
Top-level VI directives: applied to the top-level graphical program or VI. Exemplary. Exemplary top-level VI directives include:
   Clock rate—for the top-level VI only; specifies desired the clock rate, in MHz, for the overall design, e.g., the overall FPGA IP design.
   Share multipliers—for the top-level VI only; specifies implementing the algorithm by sharing multipliers.
   Initiation interval—specifies the number of cycles between new data inputs to the VI; may recursively unroll all loop structures in the current VI and the subVIs to achieve the specified initiation interval.
   Minimum latency—specifies the minimum number of cycles between the start and finish of one execution of the VI.
   Maximum latency—specifies the maximum number of cycles between the start and finish of one execution of the VI.
   Inline subVIs—specifies inlining subVI code to reduce overhead.
   Inline recursively—specifies inlining subVIs in the current VI recursively.
SubVI directives: applied to subVIs (graphical subprograms).
   Inline self—specifies inlining the current VI to the caller VI; this directive is for subVIs only.
   Inline off—specifies disabling of inlining the current VI to the caller VI.
   Array Partitioning Directives:
   Block—splits an array into equally-sized blocks of consecutive elements.
   Cyclic—splits an array into equally-sized blocks of interleaved elements.
   Complete—splits an array into individual elements.
   Reshape—allows array to be partitioned and transposed, e.g. converted from a 1 dimensional array to a 2 dimensional array of N rows where N is reshape factor
Note that the above directives and categories are exemplary only, and are not intended to limit the particular directives, categories, or their functionality to any particular form, function, or appearance.

In one embodiment, the plurality of sets of descriptive directives may be stored with the graphical program, e.g., in a project file for the graphical program, in a common directory with the project file or even in the graphical program itself. In another embodiment, the sets of descriptive directives may be stored with the project file. Additionally, or alternatively, the stored set(s) of directives (or any portion thereof) may include a reference to the graphical program or project file whereby the graphical program or project file may be determined or accessed.

In one specific embodiment, the reference may include a link between the top-level graphical program and the set of directives that includes a project reference, relative path, and absolute path to the graphical program. This feature may provide a better user experience when the user moves directives and graphical programs around on disks or different targets. Note that in general the project file does not include the graphical program, and this is why the stored set of directives may include the project reference, relative path, and absolute path (to the graphical program). A benefit of these embodiments is that if the name of the program changes, the directives do not lose the link to the program because it can be provided by the project (file).

The above method may (in combination with the synthesis tool) may thus enable the algorithm designer (developer of the graphical program) to generate different hardware (e.g., RTL (register transfer language)) implementations based on a same algorithm design (graphical program), thereby relieving the designer of the need to keep and maintain many different implementation VIs. In other words, the graphical program (or algorithm VI) may be kept together with multiple sets of descriptive directives so that the synthesis tool can generate the hardware (e.g., RTL) implementation when necessary and the designer can easily change the design and manage the different performances and resource usages by describing key specifications.

Figure 8A:
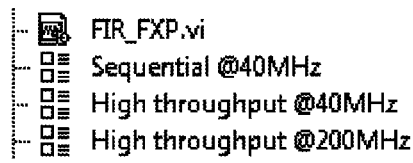
FIGS. 8A, 8B, 8C, and 8D illustrate the association of a graphical program (VI) with three different exemplary sets of directives, according to one embodiment.

For example, following the above exemplary case (FIR filter), FIG. 8A illustrates the association of the FIR graphical program (VI) of FIG. 1A with three different exemplary sets of directives, according to one embodiment. More specifically, FIG. 8A shows the top-level FIR VI (graphical program), with respective sets of directives specifying a "Sequential @40 MHz" implementation, a "High throughput @40 MHz" implementation, and a "High throughput @200 MHz" implementation.

Figure 8B:
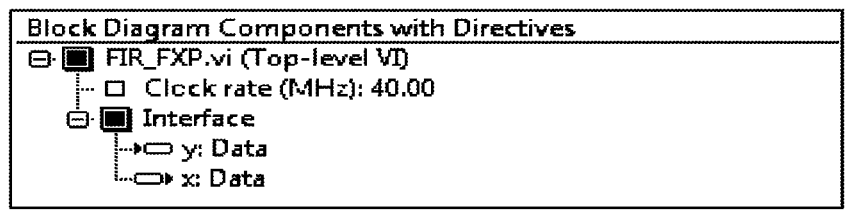
Figure 8C:
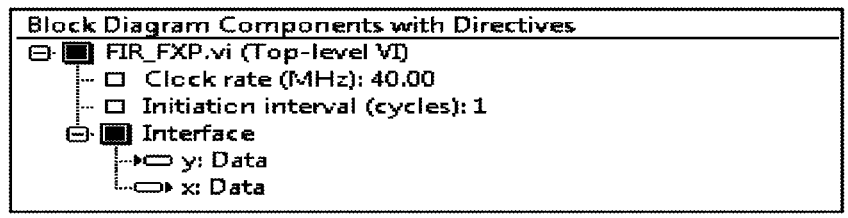
Figure 8D:
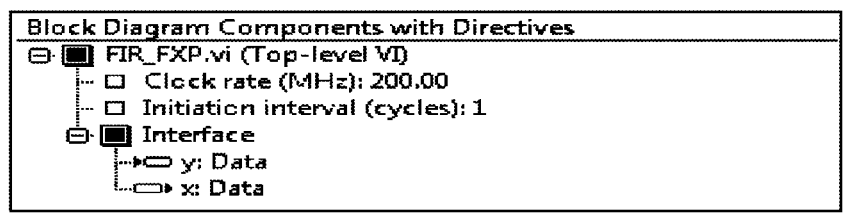

FIG. 8B illustrates display of the directive for the "Sequential @40 MHz" implementation of FIG. 8A, where a more descriptive version of the set of directives is presented in a tree diagram of graphical program components with each directive displayed under or proximate to the component to which it pertains, e.g., a directive specifying a clock rate of 40 MHz is displayed under the top-level graphical program (FIR_FX-P.vi). Similarly, FIG. 8C presents the second set of directives which specify the "High throughput @40 MHz" implementation, where, as may be seen, directives specifying a clock rate of 40 MHz, and an initiation interview of 1 cycle, respectively, are displayed under the top-level graphical program. FIG. 8D presents the third set of directives which specify the "High throughput @200 MHz" implementation, where, as may be seen, directives specifying a clock rate of 200 MHz, and an initiation interview of 1 cycle, respectively, are displayed under the top-level graphical program.

Thus, using the approach disclosed herein, the designer just needs to maintain the one algorithm VI (the graphical program), which is the first for-loop based algorithm/program. Embodiments of this approach allow the designer to focus on designing algorithms instead of spending time managing many graphical programs (e.g., VIs) for different performance and resource usage trade-offs. The descriptive representations of the directives also give the designer an idea of what the final hardware (e.g., RTL) implementation achieves when the designer returns to the directives after a while, thus further simplifying development and maintenance of the graphical program.

There are numerous directives that may be specified by users to optimize their implementations specifically based on their knowledge of the algorithm and the target (e.g., FPGA), including, for example, directives to partition some arrays to achieve higher throughput, and pipeline some multiplier to achieve higher clock rate, among others.

In most cases, default settings of the directives cannot achieve acceptable performance. For example, the arrays may be implemented with memories which may be a bottleneck (limiting factor) of throughput; the loops may not be pipelined, which may result in extra cycles. As shown in FIG. 9, there may be a large number, e.g., more than twenty) of directives available for users to set, and there may be many items (e.g., nodes) in the algorithm VI for which they can set directives, such as arrays, loops, subVIs (graphical subprograms), and multipliers, among others.

Figure 10:
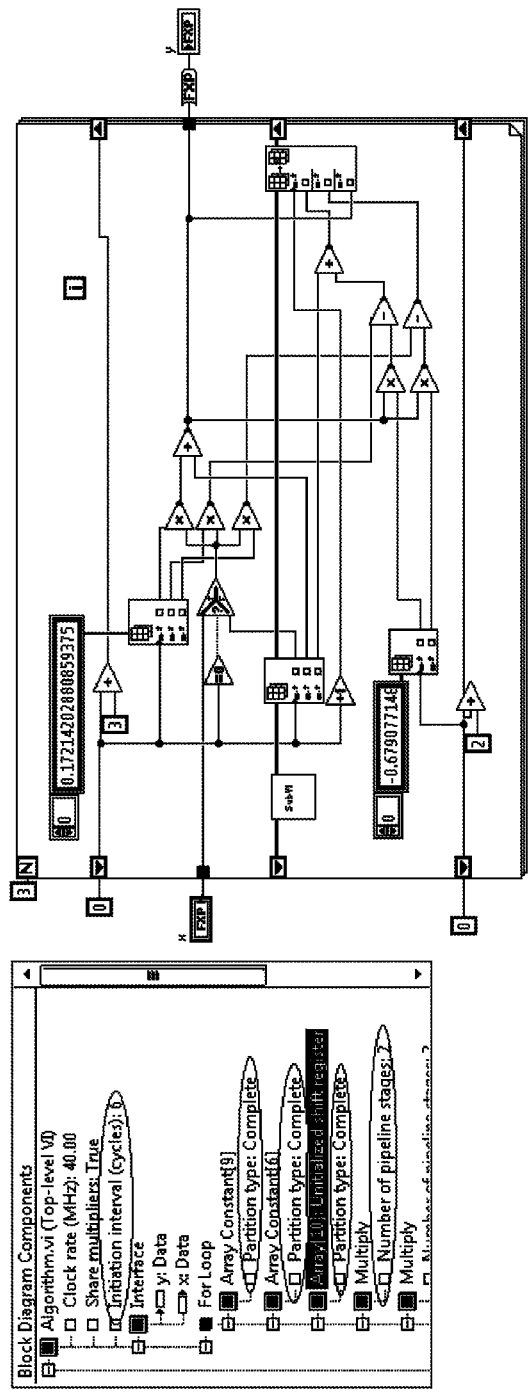
FIG. 10 illustrates an exemplary graphical program that specifies an IIR (Infinite Impulse Response) filter for implementation on hardware with numerous directives, according to one embodiment.

FIG. 10 illustrates an example in which a graphical program (e.g., algorithm VI) specifies an IIR (Infinite Impulse Response) filter for implementation on an FPGA. In this exemplary case, to achieve the performance requirement, five directives must be provided for different items, e.g., nodes, in the diagram. Moreover, in this exemplary graphical program there are more than ten items in total for which users can set directives.

However, some users may not be familiar with the targeted hardware (e.g., FPGA) or even with the algorithm (per the graphical program). They may feel overwhelmed and frustrated to have to choose from these items and directives. Additionally, they may only want to prototype the algorithm with reasonable performance on an FPGA quickly, rather than be buried in the process of selecting directives.

Accordingly, in one embodiment, the plurality of sets of descriptive directives may include one or more suites of directives, wherein each suite of directives comprises multiple directives and specifies a respective level of optimization to be applied to the graphical program. In other words, groups of directives may be provided at a higher level of abstraction so that users can easily set at least some of the directives without knowing the details of the implementation.

For example, in one exemplary embodiment, several predefined suites of directives may be provided which may be applied to all applicable items in the graphical program, such as suites respectively directed to the exemplary optimization levels described below:

Optimization level 1: This level of optimization may set various overall directives to achieve higher throughput and also save resources (e.g., gates or fixed hardware resources on the FPGA), e.g., directives to share multipliers and pipeline loops in the graphical program.

Optimization level 2: This level of optimization may set various directives to consume more resources (compared to Optimization level 1) to achieve higher throughput. For example, the suite may include directives to partition all arrays to remove the bottleneck of array accesses.

Optimization level 3: This level of optimization may set various directives to achieve as high a throughput as possible regardless of the increase in resources used. For example, the suite may include directives to unroll all loops and inline all programs (e.g., subVIs), which may greatly increase the possibility of achieving parallelism, but which may utilize extra resources.

Optimization level 4: This level of optimization may set various directives to achieve as small a resource footprint as possible. For example, the suite may include directives to share multipliers on the programmable hardware element.

Such footprint savings may be at the expense of smaller throughput, e.g., execution speed.

Thus, in some embodiments, automatic selections of directives may serve as starting points for the designer, e.g., as defaults, and/or via such suites of directives.

In some embodiments, descriptive names may be provided for each of the suites of directives, e.g., "Moderate throughput with moderate resource savings" (Optimization level 1), "High throughput" (Optimization level 2), "Very high throughput with larger footprint" (Optimization level 3), "Minimum footprint" (Optimization level 4), etc. Note that the above suites, names, and descriptions are exemplary only, and are not intended to limit the suites, directives, or names to any particular choices.

More generally, in some embodiments, each (or at least one) descriptive directive may textually indicate its meaning. For example, rather than using an obscure code (e.g., "D07") to represent a directive to unroll all loops, the directive may be signified by descriptive text, e.g., "unroll all loops", and so forth. In other words, a human reader may be able to tell the nature of the directive from its name or label.

In one embodiment, all directives for the entire hierarchy of the project/graphical program may be stored as one directory item. Thus, if only the top-level graphical program is changed, as many directives for unchanged graphical subprograms as possible may be kept.

In some embodiments, the method may include retrieving the graphical program and at least one of the one or more sets of descriptive directives in response to input. The graphical program and (one or more) sets of descriptive directives may then be provided to a synthesis tool to generate (one or more) respective hardware configuration programs. For example, the synthesis tool may be invoked to generate at least one respective hardware configuration program for deployment to the graphical programmable hardware element, based on the retrieved program and the at least one of the one or more sets of descriptive directives.

In one embodiment, each generated hardware configuration program may include information regarding the set of directives and the associated top-level graphical program that were used for its generation. Moreover, in some embodiment, by default, the generated hardware configuration program may be generated and stored at a path close to the original project and graphical program, which may make it easier for users to associate them together.

Moreover, in some embodiments, the method may further include deploying the at least one respective hardware configuration program to the graphical programmable hardware element. In other words, the generated (at least one) hardware configuration program may be used to configure (at least one) programmable hardware element, per the (at least one) set of descriptive directives, i.e., may include configuring the programmable hardware element with the hardware configuration program, which thereby deploys the graphical program (functionality) to the programmable hardware element.

Figure 11:
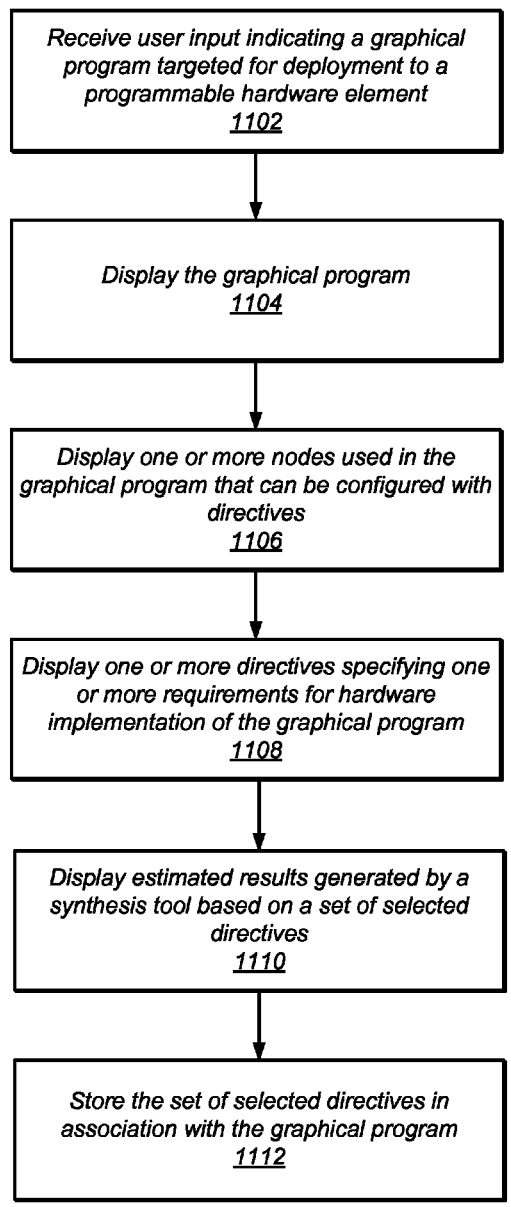
FIG. 11 is a flowchart diagram illustrating one embodiment of a method for interactively designing a hardware implementation of a graphical program.

FIG. 11—Flowchart of a Method for Interactively Designing a Hardware Implementation of a Graphical Program FIG. 11 illustrates a method for interactively designing a hardware implementation of a graphical program, according to one embodiment. The method shown in FIG. 11 may be used in conjunction with any of the computer systems or devices shown in the above Figures, among other devices. In various embodiments, some of the method elements shown may be performed concurrently, in a different order than shown, or may be omitted. Additional method elements may also be performed as desired. In some embodiments, the method elements presented below may be performed by a graphical user interface (GUI). In other words, a GUI may be provided for specifying implementation directives of a graphical program for deployment on a programmable hardware element, and may provide the functionality described below. Thus, in some embodiments, any of the method elements described may be performed by or via the GUI. As shown, this method may operate as follows.

First, in 1102, user input indicating the graphical program may be received. For example, the user may provide a name and/or project file for the graphical program, possibly including a directory path. Alternatively, the user may select the graphical program (or project file) from a list, menu, or palette of graphical programs (or project files), e.g., via a pointing device, e.g., a mouse, touch pad/screen, etc., as desired.

In 1104, the graphical program may be displayed (on a display device). As noted above, the graphical program may comprise a plurality of interconnected nodes that visually indicate functionality of the graphical program. Moreover, as noted above, in some embodiments, the graphical program may include or be a graphical data flow program.

In 1106, one or more nodes of the graphical program may be displayed, e.g., in the GUI. Each node of the one or more nodes may be configurable in accordance with a directive to generate a respective hardware implementation of the node. Thus, in one embodiment, only those nodes (or components) of the graphical program for whom directives may be specified may be displayed (in 1108). Note that the display of nodes in 1106 is preferably distinct from the display of the graphical program in 1104. For example, in one embodiment, the one or more nodes of the graphical program may be displayed in a tree diagram.

Note further that as used herein, the term "node" may refer to any of various graphical program elements or components, including for example, but not limited to, arrays, clusters, or other data structure types, terminals, feedback nodes, constants, and in some cases, wires, and so forth.

In 1108, one or more directives may be displayed, e.g., in the GUI. Each directive may specify one or more requirements for a hardware implementation of the graphical program. Moreover, each directive of the one or more directives may be selectable for application to a specific type of node in the graphical program.

In 1110, estimated results generated by a synthesis tool may be displayed in accordance with a set of selected directives. In other words, whichever directives are selected (by a user or programmatically) may be used by a synthesis tool to generate estimates of results for the specified hardware implementation, e.g., via simulation, lookup tables, etc. The estimated results may include estimates of any of a variety of performance or resource (or other) metrics applicable to the graphical program/implementation, e.g., resource utilization, execution speed, throughput, latency, etc., as desired. For example, in one embodiment, the estimated results may include one or more of a summary of estimated results, estimated device utilization, or estimated performance, among others.

In 1112, the set of selected directives may be stored in association with the graphical program. The graphical program and the selected set of directives may be useable by the synthesis tool to generate a hardware configuration program that is deployable to the programmable hardware element. As discussed above, in various embodiments, the association between the graphical program and the set of selected directives may be implemented in any of a variety of ways, including the stored directives having a reference or link to a project file for the graphical program, e.g., possibly including a relative and/or absolute path to the graphical program. Any other means for associating the graphical program and the set of selected directives may be used as desired.

As also indicated above, in some embodiments, each directive may be or include a descriptive directive textually indicative of its meaning, i.e., instead of being represented with an obscure alphanumeric code which might not be meaningful to a user.

In one embodiment, two or more selectable suites of directives may be displayed, e.g., by the GUI, where each suite of directives includes multiple directives and specifies a respective level of optimization to be applied to the graphical program. Examples of such suites are described above. User input may be received selecting at least one of the two or more suites of directives for application to the graphical program (or a subset thereof). In some embodiments, the method (or the GUI) may automatically select at least one directive or suite of directives by default. However, any of the automatically selected directives or suites of directives may be overridden by user input. Moreover, in one exemplary embodiment, directives applied to components (by default or by a user) may be overridden by other directives, e.g., based on specified priorities, use cases, etc., as desired. For example, a function node that receives a constant as an input may be configured by default to allocate memory for the constant, where the memory is specified by a directive (for the function node) to use a fixed hardware resource, e.g., a block RAM; however, in different instances of the function node (in the graphical program) two different respective constants may be provided as input, where each constant is specified by a directive to be implemented in a different respective way, one by block RAM, the other via array gates on the FPGA. In this case, the "implement memory via array gates" directive for the node may override the default "block RAM" directive.

In a further embodiment, user input selecting a first node of the one or more nodes may be received (e.g., to or by the GUI), in response to which the selected first node may be highlighted. Directives applicable to the first node may then be displayed. Said another way, in response to user-selection of a node (from the displayed one or more nodes), the method (or GUI) may display all and only directives applicable to the first node. In this way, users may readily understand from which directives they can select for a given graphical program element. In another embodiment, in response to user-selection of a node (from the displayed one or more nodes), the method (or GUI) may not only highlight the node (in the display of the one or more nodes), but may highlight the selected first node in the display of the graphical program, thereby allowing the user to see exactly where in the graphical program the selected node is used, and thus, where the directive is to be applied.

The method may further include receiving user input selecting at least one directive for application to the first node of the one or more nodes, where the set of selected directives includes the at least one directive selected by the user. In other words, the user may select particular directives to apply to selected nodes (that are used in the graphical program). Similarly, as described above, the method may display suites of directives selectable by the user for application to the graphical program (or select elements thereof), from which the user may select at least one suite. The set of selected directives may then also include any selected suites of directives.

Moreover, one or more of the above method elements, e.g., 1106, 1108, and 1110, may be performed multiple times to add further directives to the set of selected directives used to generate the estimated results. For example, in one embodiment, further user input selecting another node of the one or more nodes may be received. All and only directives applicable to the other node may then be displayed in response to the user input selecting the other node. Further user input selecting another at least one directive for application to the other node may also be received. The receiving further user input selecting another node, the displaying all and only directives applicable to the other node, the receiving further user input selecting another at least one directive for application to the other node, optionally, the displaying and selecting of further suites of directives, and the displaying of estimated results, may be repeated one or more times in an iterative manner. The set of selected directives then includes each of the other at least one directives (and/or suites) selected by the user.

In other words, the user may successively select nodes, see what directives may be applied to them, then select the directives to be applied, where these selected directives, along with any default directives (or suites) and selected suites, compose the set of selected directives stored for subsequent retrieval and application. As the user progressively selects these directives, the estimated results may be updated to reflect the current set of selected directives, which may then be taken into account by the user in selecting or modifying the directives stored as part of the set of selected directives. Of course, the method may further include receiving user input removing or modifying previously selected directives (or suites of directives), in which case the displayed estimated results may also be updated accordingly.

The estimated results may be presented in any of various ways. For example, in one embodiment, displaying the estimated results may include displaying applied directives that are related to respective ones of the estimated results. In other words, the display of the estimated results may indicate the applied directives under which the resulting estimates were made, e.g., per estimate. Similarly, in another embodiment, displaying the estimated results may include displaying nodes of the graphical program that are related to respective ones of the estimated results, i.e., the display of the estimated results may indicate the respective nodes that are germane to each estimated result.

In some embodiments, the GUI may allow the user to invoke the synthesis tool to generate the estimated results, in response to which the estimated results may be displayed in the GUI. Moreover, in one embodiment, the GUI may provide a option to verify timing, selection of which by the user may result in the GUI calling the synthesis tool (e.g., an integrated synthesis environment (ISE)) to provide solid device utilization and timing results from a compilation.

In some embodiments, the method may include storing the estimated results, e.g., possibly in association with the stored set of selected directives. In one embodiment, the GUI may allow the user to save the directives and/or estimation results in a user readable text file, although any other file types may be used as desired. Additionally, in some embodiments, the method may include storing an estimated results history, which may help the user track multiple estimation results from various sets or suites of directives applied to the graphical program. In other words, as the user interactively specifies the various directives and respective estimated results are generated, the method may keep track of these estimated results, along with the directives upon which the estimated results were based. The GUI may accordingly provide undo/redo functionality, whereby the user may backtrack or recapitulate previous selection/generation actions or sequences.

In one embodiment, the method (GUI) may provide means, e.g., a button, menu item, etc., that allows the user to import a previously saved set of directives, and to view/edit the directives and invoke performance estimation (generation of estimated results) via the GUI based on the imported directives.

FIGS. 12-17—Exemplary GUI

FIGS. 12-17 illustrate various features of an exemplary GUI implementing the method of FIG. 11, according to one embodiment, although it should be noted that the GUI shown is meant to be exemplary only, and that other types of GUI may be used as desired.

In one embodiment, respective portions of the GUI may be accessible via a tabbed window of the GUI, although other arrangements for the GUI may be implemented as desired. In other words, in some embodiments, the GUI may be implemented as a tabbed window, where portions of the GUI are accessible via respective tabs; however, in other embodiments, the portions of the GUI may be accessed via other means, e.g., menus, respective tiles in a tiled window display, etc., as desired.

Figure 12:
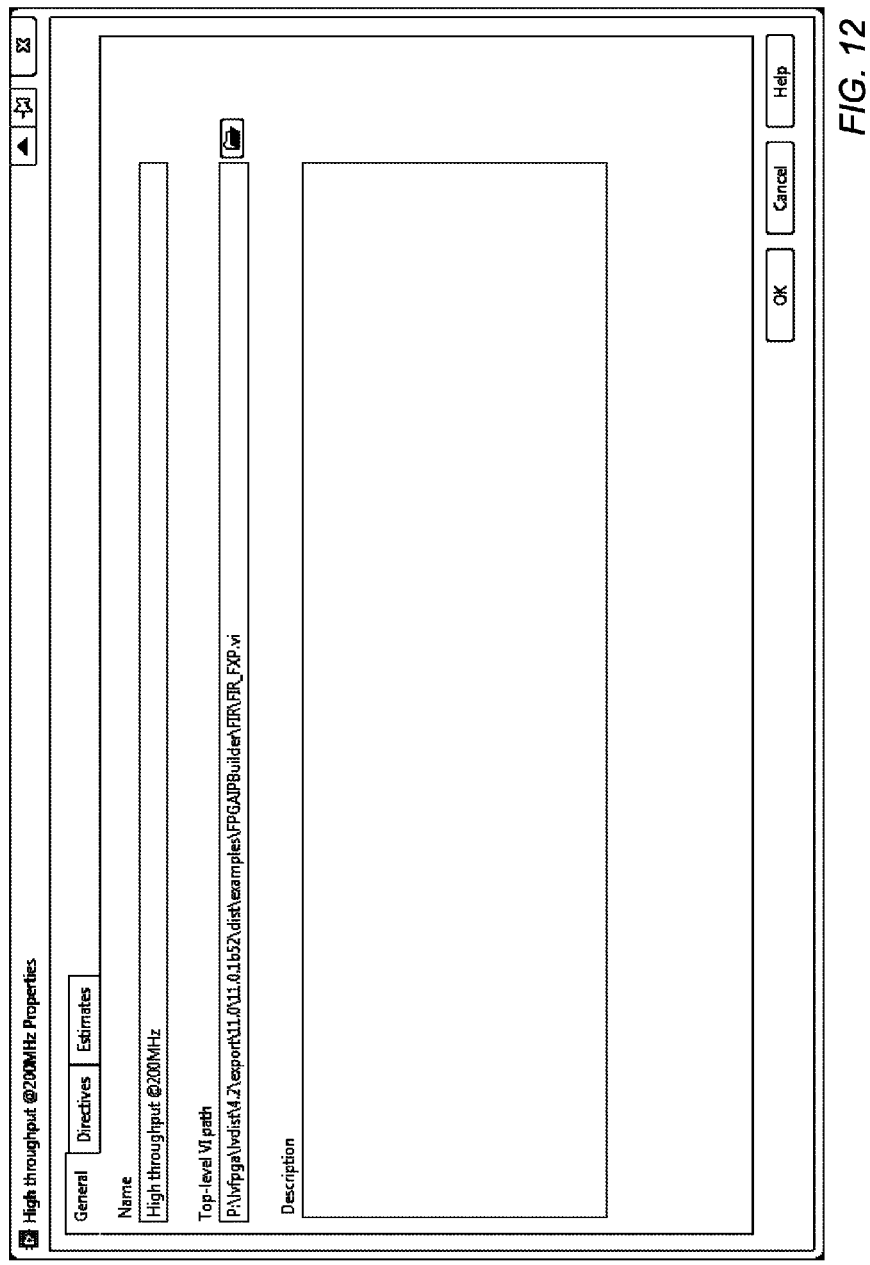
FIGS. 12-17 illustrate respective features of an exemplary GUI implementing the method of FIG. 11, according to one embodiment.

For example, the user input indicating the graphical program described above in method element 1102 may be received via a first portion of the GUI, where the first portion of the GUI is accessible via a first tab. FIG. 12 illustrates an exemplary tabbed window of a GUI, labeled "General", in which the user has specified a path to the (top-level) graphical program (VI), specifically:

"P:\lvfpga\lvdist\4.2\export\11.0\11.0.1b52\dist\ examples\FPGAIPBuilder\FI R\FIR_FXP.vi".

In the exemplary embodiment of FIG. 12, a field is also provided whereby the user may provide a name for the collective items generated via use of the GUI, e.g., the stored set of selected directives, estimated results, etc. In some embodiments, this may also include a hardware configuration program generated based on the set of stored directives.

Figure 13:
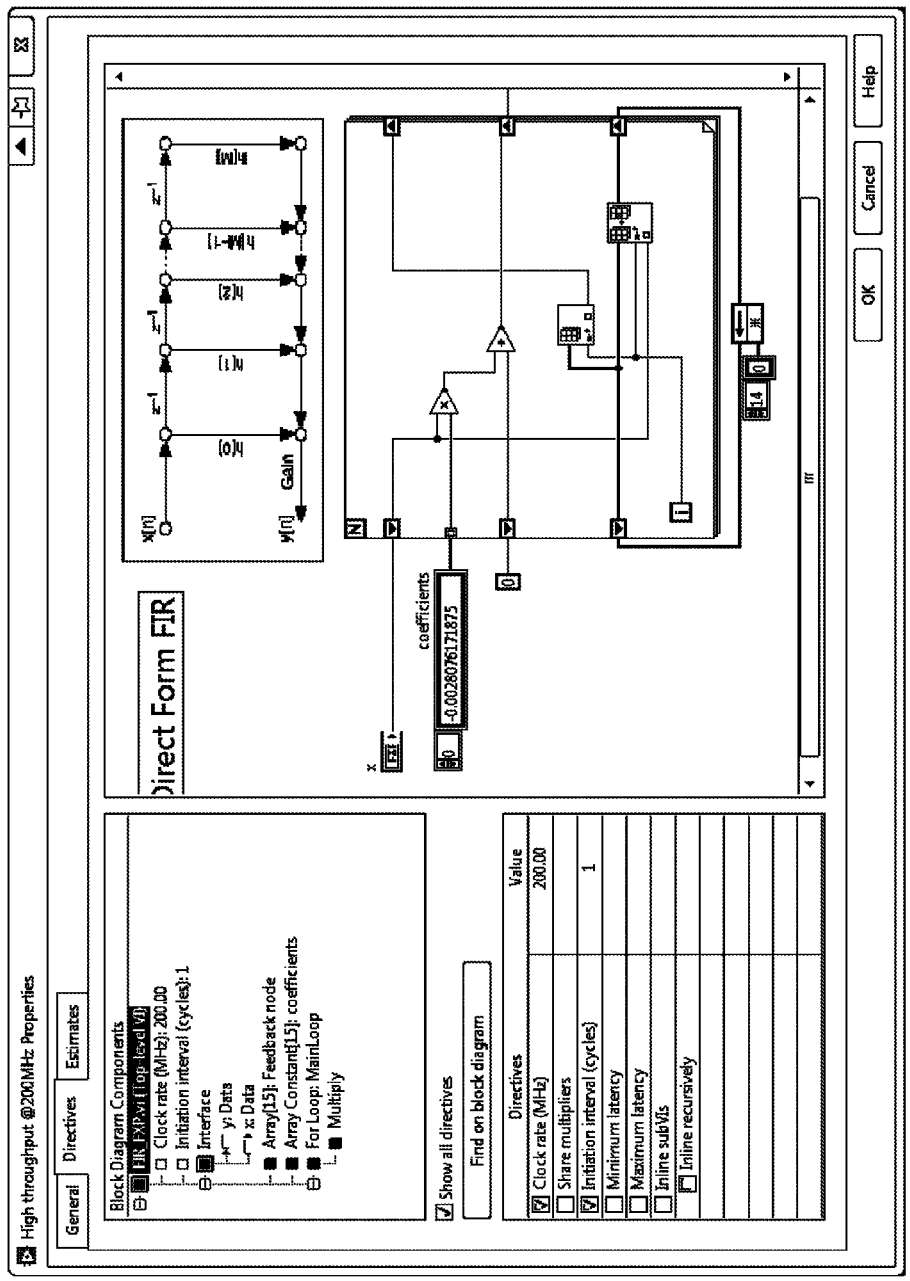

In one embodiment, the graphical program, the one or more nodes of the graphical program, and the one or more directives may be displayed in a second portion of the GUI. The second portion of the GUI may be accessible via a second tab (or other means, as indicated above). FIG. 13 illustrates an exemplary embodiment of the GUI where the second portion of the GUI is presented in a tabbed window labeled "Directives". As may be seen, this Directive window displays the one or more nodes in a tree diagram under a section of the window labeled "Block Diagram Components", which presents a hierarchy of the graphical program nodes (components) for which directives may be specified. Note that in the embodiment shown, the top-level graphical program (VI), FIR_FXP.vi is highlighted, e.g., as a default, or in response to user input selecting that component (which may be considered to be a node). As also shown, the Directives window presents available directives for possible application to the selected component or node, in this case, the top-level graphical program, in a section of the window labeled "Directives" (on the left of FIG. 13, below the tree diagram of nodes). Note that each directive displayed has a checkbox whereby the user may select that directive for application to the selected node/component of the tree diagram. In some embodiments, the directives may be displayed in a tree diagram, e.g., whereby a hierarchy of directives may be indicated. In this manner, categories or the above mentioned suites of directives may be presented, along with their constituent directives. In the embodiment shown, a selectable option is also provided for invoking display of all directives that have been configured, not just those suitable for the selected node/component; in this particular case, the option is checked, and so the GUI displays all directives.

As FIG. 13 also shows, in some embodiments, the graphical program, which may also be referred to as a block diagram, may also be displayed in the GUI, as shown in the window portion on the right of the Directives window. Displaying the graphical program (block diagram) may be useful to remind the user what the graphical program or algorithm looks like.

In one embodiment, the GUI may respond to user selection of a node (from the one or more nodes), e.g., in the tree diagram of Block Diagram Components by indicating where in the graphical program (block diagram) the selected node occurs. For example, as shown in FIG. 13, the GUI may provide means whereby the user can invoke this functionality, in this case, a "Find on block diagram" button. In one embodiment, selecting this button invokes display in the graphical program of an indication of the currently highlighted (e.g., selected) node. In another embodiment, selecting this button (or other means) may toggle an option such that any node selection made by the user (from the one or more nodes) may invoke an indication of that node in the display of the graphical program.

Figure 14:
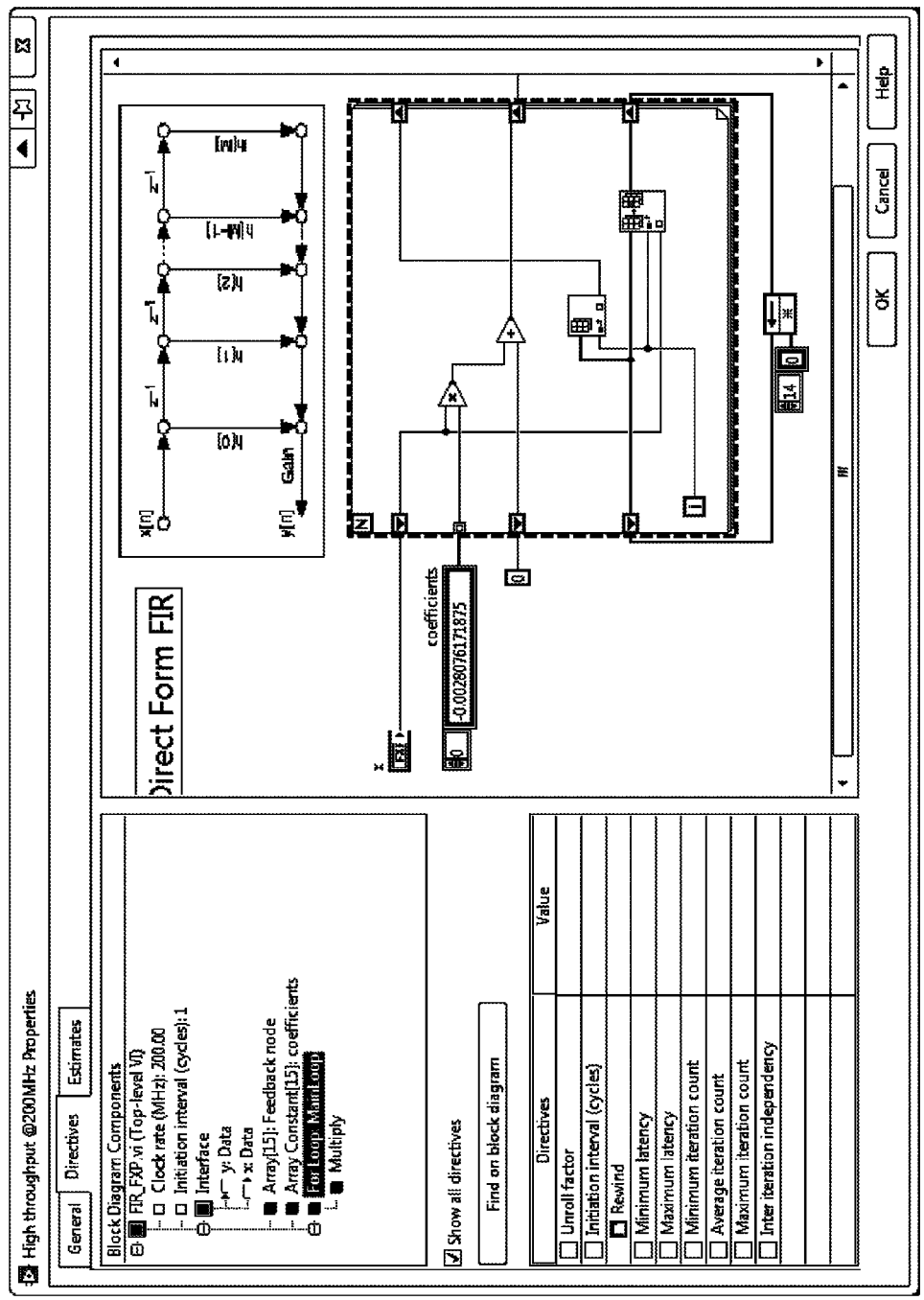

FIG. 14 illustrates an exemplary embodiment of the GUI where the user has selected a "For Loop: MainLoop" of the Directives window, and where the selected For Loop is also indicated in the display of the graphical program. In this particular embodiment, the Foor Loop (node) is indicated using a dashed line around the loop structure, although any other type of indication may be used as desired, e.g., other types of line, highlighting, labeling, indicative arrow, and so forth.

Figure 15:
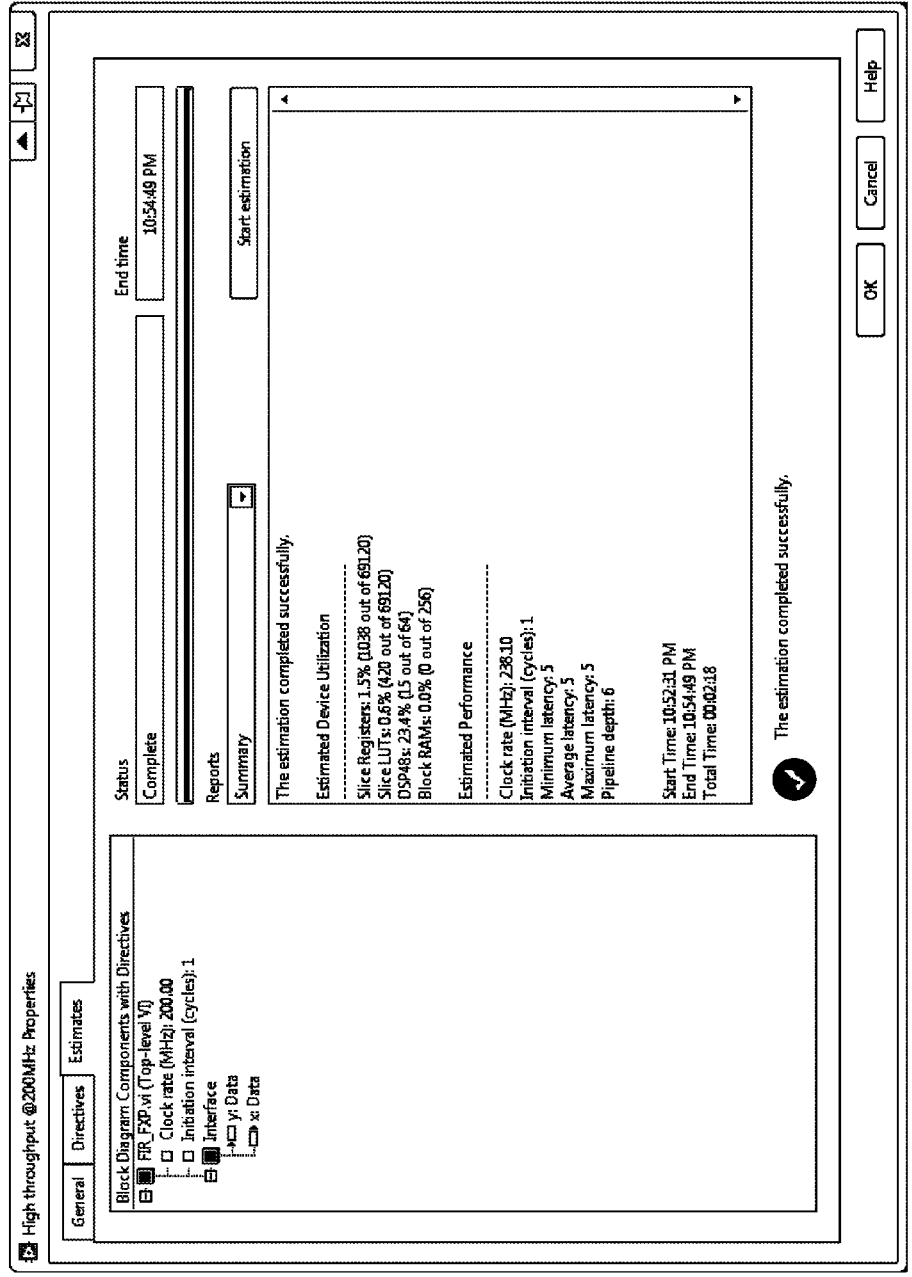

FIG. 15 illustrates an exemplary embodiment of the GUI where the estimated results are displayed in a third portion of the GUI, where the third portion of the GUI is accessible via a third tab, in this case, labeled "Estimates". In the embodiment shown, the estimated results are presented in a section of the window to the right. As also shown, in this exemplary embodiment, the GUI provides a control for invoking the generation of estimated results by the synthesis tool in the form of a button labeled "Start estimation". This exemplary GUI also provides a "Status" field that indicates when the estimation process is complete, as well as an "End time" field that indicates when the estimation process completed.

In some embodiments, the GUI may allow the user to specify various different reports regarding the estimation results, as indicated by the "Reports" field. For example, in the embodiment of FIG. 15, the user has selected "Summary", thereby invoking display of the information shown below the field, which includes summary information related to "Estimated Device Utilization" (resource use), and "Estimated Performance" (e.g., speed of execution). Other reports may include more detailed information regarding these metrics or other aspects of the process, as desired, e.g., the directives used, configuration information, and so forth, as described below.

In one embodiment, the GUI portion related to estimated results may also present a version of the display of the one or more nodes described above (see method element 1106), as shown in the left hand side of FIG. 15. For example, in one embodiment, the GUI may display only those nodes to which directives were applied, and thus, to which the estimates primarily pertain. In some embodiments, the nodes may be displayed in a tree diagram. Moreover, in some embodiments, the GUI may display the directives associated with each of the displayed nodes, e.g., in the tree diagram, where each node's respective directives may be displayed under or proximate to the node. In one embodiment, the GUI may provide an overview of all the directives applied to generate the estimated results, e.g., a list, tree diagram, or even a textual summary or description of the directives.

In some embodiments, the GUI may display the estimates (estimated results) in a tree diagram. For example, in one embodiment, the display of estimates may correspond at least somewhat to the tree diagram of nodes, e.g., the estimates may be displayed in a hierarchical manner, with general estimation results being broken out into more detailed constituent results. In another embodiment, the GUI may display the estimates in tandem with a tree diagram of the nodes so that the user can easily see correspondences between the two.

Figures 16, 17:
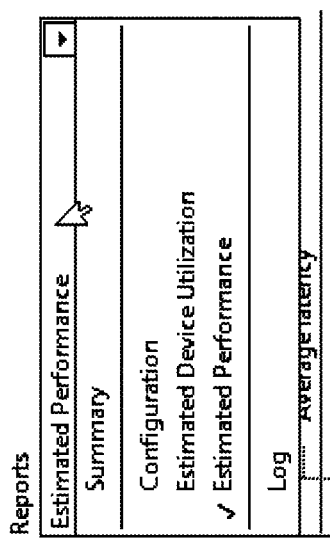

FIG. 16 illustrates an exemplary embodiment of the GUI where the user has selected a different report from the Reports options, specifically, "Estimated Performance", resulting in the detailed display of such information shown in FIG. 17. As FIG. 17 shows, the GUI displays a tree diagram of the nodes to which directives were applied, where the tree diagram also displays related descriptive directives under each node in the diagram. Additionally, the GUI further displays requested values for some of the directives, and the estimated results corresponding to each directive, where the requested values and the respective estimated results are presented on the same (horizontal) lines as the directives in the diagram, e.g., under the top-level graphical program node/component (TransferFunction.vi), the descriptive directive "Clock rate (MHz) is displayed, and on the same line, the requested value 40.00 and the estimated result 42.11, are shown. Thus, via such detailed reports, the user can easily assess the impact of the directives selected for the graphical program nodes.

As noted above, in some embodiments, the GUI may be coupled to or included in a graphical program development environment, e.g., whereby the GUI can display the graphical program. In a further embodiment, the GUI may be configured to receive user input selecting the set of descriptive directives or another set of descriptive directives from among a plurality of selectable sets of descriptive directives, and may display the graphical program overlaid with indicators of the descriptive directives of the selected set of descriptive directives. For example, say that the user has configured the unroll factor directive of a For Loop to be 4. When the user opens the source VI (graphical program) with that For Loop, the user may specify or invoke an overlay of a specific set of directives (or indications thereof) on the graphical program. The GUI may then present some kind of visual indication attached to, or visually associated with, that For Loop that indicates to the user that the unroll factor=4. If the user chooses to overlay a different set of directives, or modifies a directive, the overlay may be updated accordingly, e.g., to show a different unroll factor.

Figure 18:
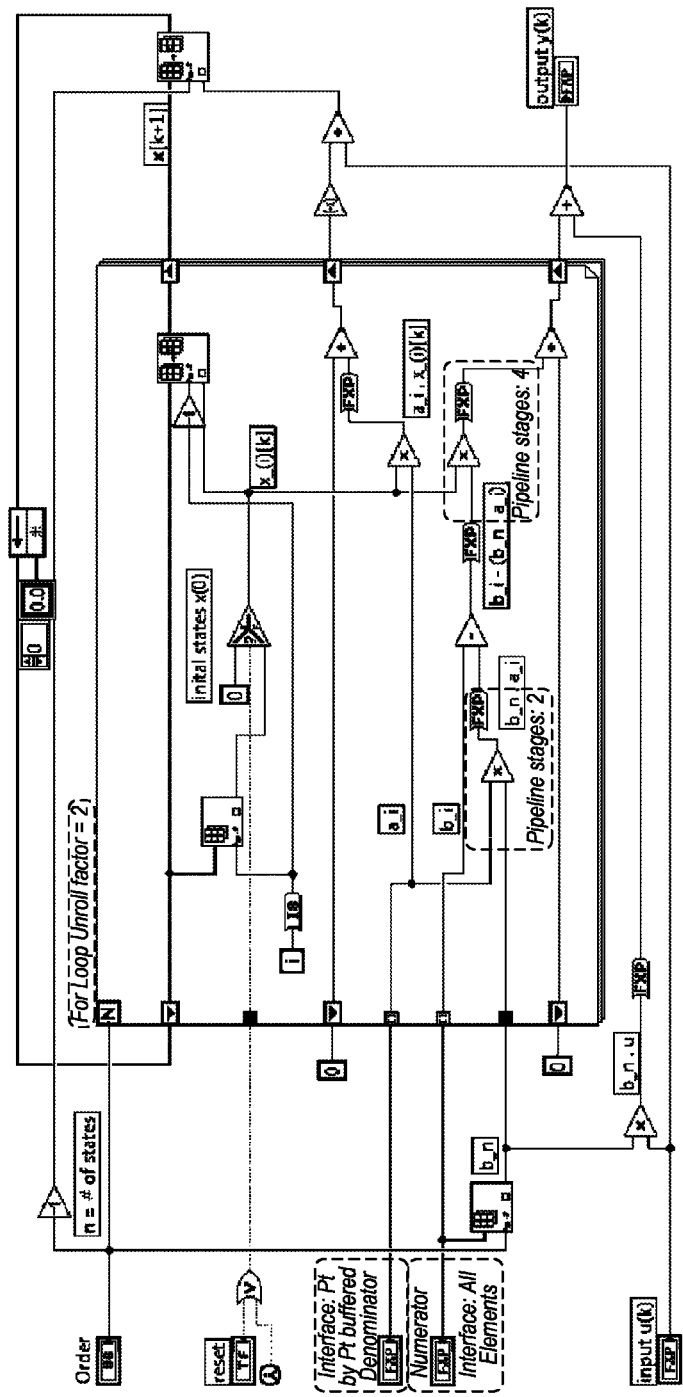
FIG. 18 illustrates an exemplary overlay of directives on a graphical program, according to one embodiment.

FIG. 18 illustrates an exemplary display of such an overlay, in which configured (specified) directives are displayed on the graphical program (VI) itself. Such a display may be provided in one of the GUI portions or windows discussed above, e.g., in the "Directives" window.

As may be seen, in this particular (and exemplary) example, the directives are presented as semi-transparent rounded rectangles overlaid on the graphical program components or nodes to which they apply. Thus, for example, a directive specifying an unroll factor of 2 for a For Loop is displayed over a portion of a For Loop in the graphical program (to which it applies); two pipeline related directives are displayed overlaid on respective multiply nodes; an interface directive specifying point by point buffering is displayed over a Denominator input or terminal node; and an interface directive specifying "all elements" (which refers to the requirement that the generated IP may expect all elements of the array input at one time) is displayed over a Numerator input or terminal node. Of course, in other embodiments, other means for indicating directives overlaid on the graphical program may be used as desired.

Moreover, the GUI may be further configured to receive user input to the displayed graphical program selecting an indicator of a descriptive directive (which may be the directive itself), after which user input editing the descriptive directive may be received, thereby modifying the descriptive directive. The modified descriptive directive may then be stored, e.g., thereby updating the stored set of selected directives, or, alternatively, the available/selectable directives, for subsequent use.

The set of selected directives and the graphical program may be retrievable in response to user input for provision to the synthesis tool (or another synthesis tool) to generate the hardware configuration program. Thus, once the user has interactively specified the set of selected directives as described above, and the set has been stored, the set of selected directives may subsequently be retrieved for provision to the synthesis tool to generate the hardware configuration program. Moreover, the hardware configuration program may be stored and/or deployed to the programmable hardware element, i.e., used to configure the programmable hardware with the graphical program in accordance with the retrieved set of directives. Note the above method may be used to generate multiple sets of selected directives, any of which may be retrieved in response to user input for provision to the (or a different) synthesis tool to generate a respective hardware configuration program. Similarly, each of these respective hardware configuration programs may themselves be retrievable for deployment to, i.e., configuration of, a programmable hardware element, as desired.

Memory Implementation Directives

As noted above, memory used in and by graphical programs may be implemented in hardware in a variety of ways, where the implementation used may depend upon performance or resource footprint requirements, among other considerations. In addition to explicit memory allocation and use in a graphical program, e.g., for explicit program elements, such as data structures, e.g., arrays, clusters (heterogeneous data structures), constants, etc., there may be implicit memory allocations not immediately apparent to a viewer, referred to as internal buffers, which may be used for I/O, e.g., terminal nodes, working memory for calculations performed by a node, and so forth. These memory resources can also be implemented in various ways, with corresponding impacts on footprint or performance on the target platform (programmable hardware element).

Accordingly, embodiments or an interactive approach for specification of memory resource implementations for a graphical program targeted for deployment on a programmable hardware element may be provided.

Figure 19:
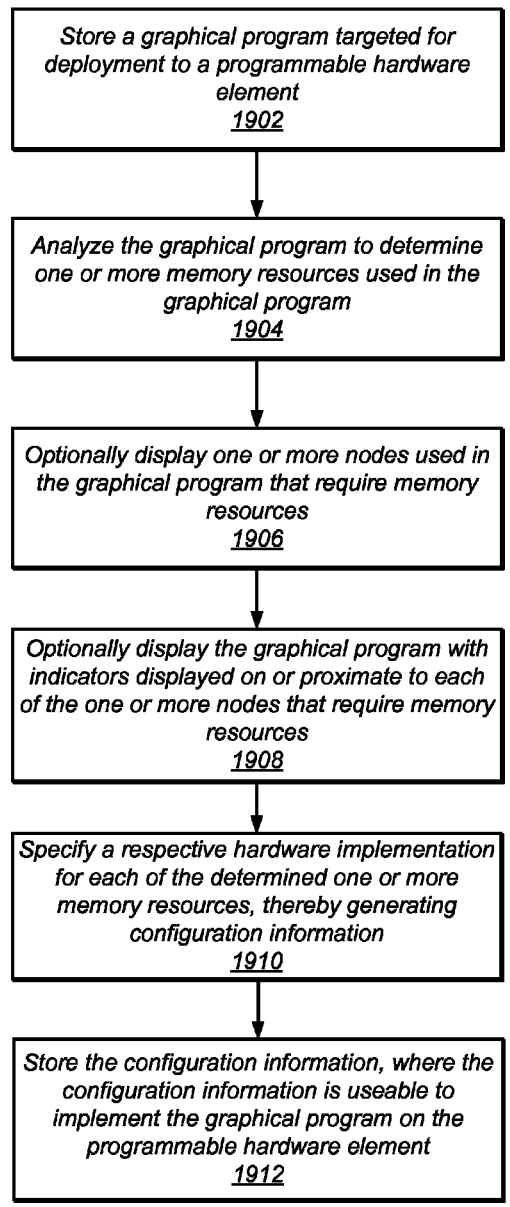
FIG. 19 is a flowchart diagram illustrating one embodiment of a method for interactively specifying hardware implementation of memory for a graphical program, according to one embodiment.

FIG. 19—Method for Specifying Hardware Implementation of Memory for a Graphical Program FIG. 19 is a flowchart diagram illustrating one embodiment of a method for interactively specifying hardware implementation of memory for a graphical program. The method shown in FIG. 11 may be used in conjunction with any of the computer systems or devices shown in the above Figures, among other devices. In various embodiments, some of the method elements shown may be performed concurrently, in a different order than shown, or may be omitted. Additional method elements may also be performed as desired. In some embodiments, the method elements may presented below may be performed by a graphical user interface (GUI). In other words, a GUI may be provided for specifying memory implementation for a graphical program for deployment on a programmable hardware element, and may provide the functionality described below. Thus, in some embodiments, any of the method elements described may be performed by or via the GUI. As shown, this method may operate as follows.

First, in 1902, a graphical program may be stored. As indicated above, the graphical program may include a plurality of interconnected nodes that visually indicate functionality of the graphical program, and may be targeted for deployment to a programmable hardware element. Additionally, in some embodiments, the graphical program may be a graphical data flow program. Moreover, the programmable hardware element may be or include one or more field programmable gate arrays, or other types of programmable hardware, e.g., ASICs, etc. The graphical program may have been created in any of a variety of ways, as described above.

In 1904, the graphical program may be analyzed, thereby determining one or more memory resources used in the graphical program. In other words, the method may programmatically determine all memory uses in the graphical program, including both explicit and implicit memory allocations. In other words, embodiments of the method may analyze the graphical program and determine which graphical program elements (which may be referred to generally as "nodes" or "components") require memory resources, whether as an explicit data object (memory resource) or an internal (implicit) buffer. As noted above, the node could be an instance of an array or cluster, a terminal, a wire, constants, a feedback node, etc. Note that not all instances may represent unique internal buffers; certain functions may force a copy of the memory resource used by the node to be made (therefore creating another unique buffer) while other functions might not need to make such a copy.

In 1906, one or more nodes used in the graphical program that require memory resources may optionally be displayed. The one or more nodes may be displayed in any of a number of ways. For example, in one embodiment, displaying the one or more nodes used in the graphical program may include displaying an indication of each of the one or more memory resources proximate to a respective node of the one or more nodes used in the graphical program that requires the memory resource. In some embodiments, displaying the one or more nodes may include displaying the nodes in a tree diagram. For example, the tree diagram may display the nodes that use memory resources in a hierarchical manner, with the memory resource(s) used by each node displayed under the node, e.g., as a sub-item. In one embodiment, the method may include receiving user input selecting a first node of the one or more nodes, and highlighting the selected first node.

In 1908, the graphical program may optionally be displayed, including displaying indicators on or proximate to each of the one or more nodes displayed in the graphical program that require memory resources. Said another way, nodes or components displayed in the graphical program that require memory resources may be indicated as such. The indicators can be of any type desired, e.g., simple graphical symbols, e.g., red dots, triangles, etc., highlighting of the nodes, or even descriptive labels, among others. In one embodiment, displaying the indicators includes displaying a first indicator corresponding to the selected first node in response to the user input selecting the first node (in the component display).

Figure 20A:
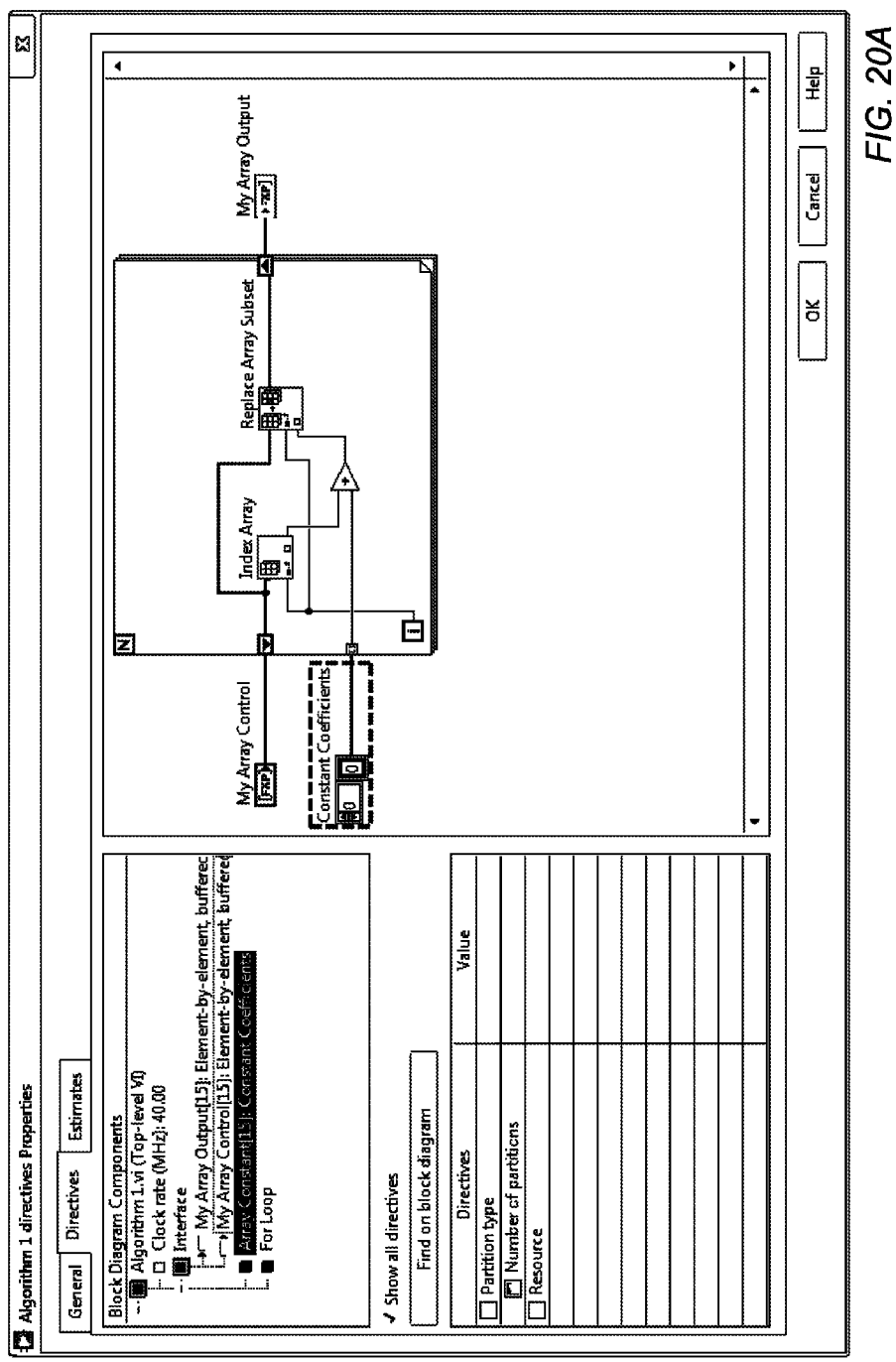
FIGS. 20A and 20B illustrate the display of a graphical program with memory resource indicators, as well as separate display of nodes used in the graphical program that require memory resources, according to one embodiment.
Figure 20B:
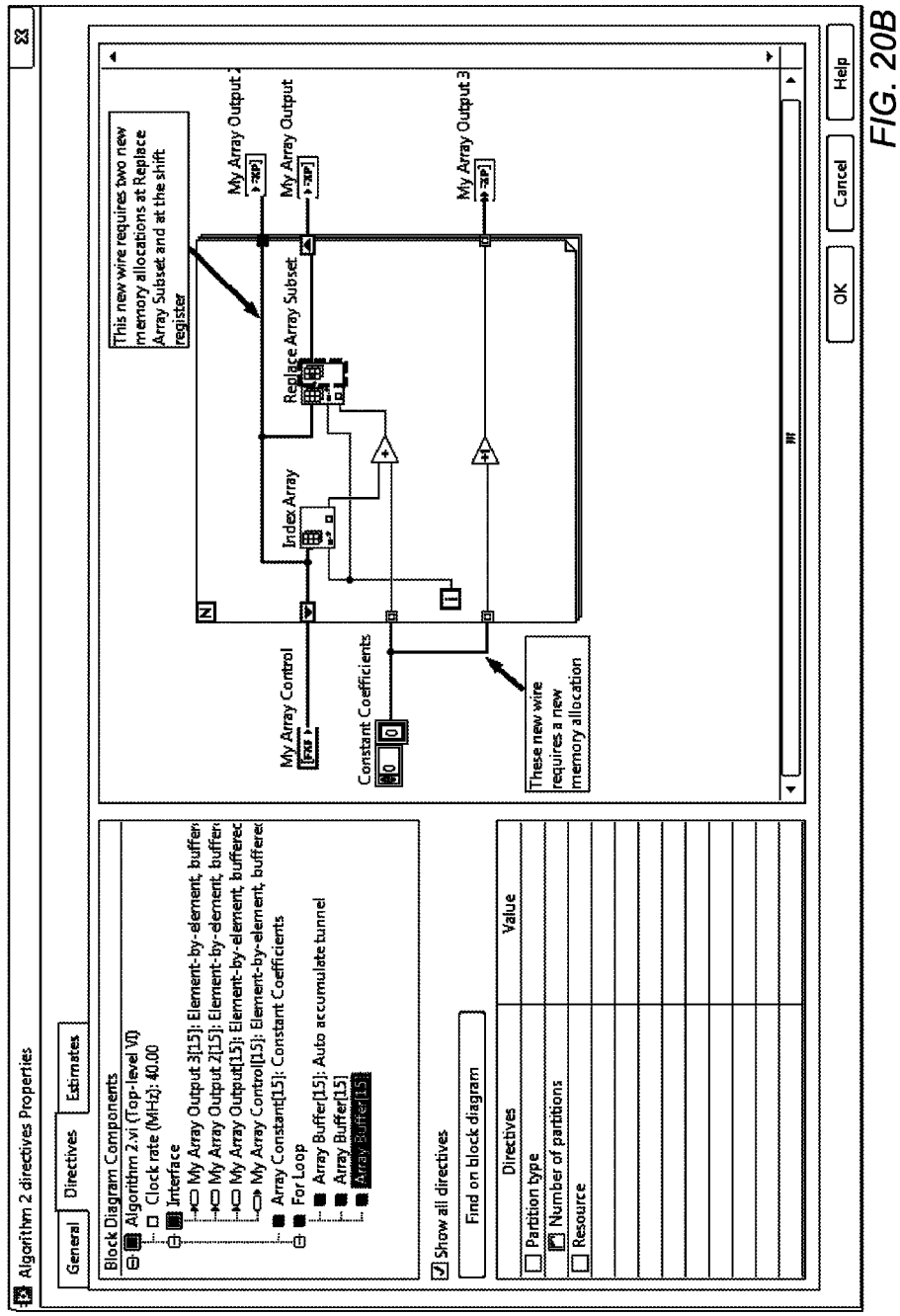

FIGS. 20A and 20B illustrate exemplary embodiments of the optional display of the one or more nodes used in the graphical program that require memory resources (1906), and the optional display of the graphical program (with indicators of memory resource requirements) (1908).

More specifically, FIG. 20A illustrates a graphical program (or VI) that includes an array constant, also indicated in the display of block diagram components (i.e., the display of the one or more nodes used in the graphical program that require memory resources, in this case, a tree diagram), since it will be implemented on the programmable hardware element, e.g., as a BRAM. In this exemplary embodiment, the user has clicked on the Array Constant [15]: Constant Coefficients in the tree diagram, and has further clicked on the "Find on Block Diagram" button, resulting in the Array Constant[15] being highlighted in the tree diagram, and the indicator on the block diagram view (display of the graphical program), in this case, a dashed line around the node.

Note that the My Array Control and My Array Output terminals shown in the graphical program are presented in the component display (Block Diagram Components) under the "Interface" component. These elements are treated differently because they are used to interface the resulting hardware implementation (e.g., IP block) to other IP blocks, and so the memory allocation for these elements are owned by some other entity, not this graphical program.

Now, consider an exemplary case where the user has modified the graphical program, including branching some of the wires such that three additional memory allocations are needed (as compared to the configuration of FIG. 20A), as FIG. 20B illustrates. After the method has (re)analyzed the graphical program, these additional allocations are shown presented under the For Loop node in the component display, labeled as "Array Buffers". Note that in this exemplary embodiment, while one of the memory resources is labeled with the additional information "Auto accumulate tunnel", two of these resources are generically labeled as Array Buffers. In other embodiments, these resources may be labeled with additional information, e.g., "auto-index tunnel", and "Replace Array Subset", respectively. Note that in FIG. 20B, the user has selected the third memory resource under the "For Loop" component in the component display (as well as the "Find on block diagram" option), in response to which the "Replace Array Subset" node is shown highlighted in the graphical program display.

In some embodiments, the user may select all of the components/resources (e.g., and the "Find on block diagram" option), and the graphical program display may then highlight all of the nodes with memory resource requirements.

In 1910, a respective implementation may be specified for each of the one or more memory resources on the programmable hardware element, thereby generating configuration information. Note that this specification may be performed in response to user input, or programmatically (i.e., automatically, via software). In other words, in some embodiments, users can configure the memory resources, e.g., arrays and buffers, interactively, allowing users to control what kind of hardware resource is used for any specific memory resource, while in other embodiments, default selections may be used, or the selections may be made programmatically, e.g., based on heuristics, size of array, available resources, etc., an expert system, and so forth.

Thus, for example, in one embodiment, specifying a respective implementation for each of the one or more of the memory resources may include receiving first user input selecting a first memory resource of the at least one memory resource, in response to which a plurality of selectable implementation options for implementing the first memory resource may be displayed. Then, second user input may be received selecting a first implementation option from the plurality of implementation options for implementing the first memory resource. The method may analyze context or manner in which the memory resource is used in the graphical program (and possibly requirements or directives for the graphical program) and may programmatically narrow the options presented to the user based on this analysis. In other words, the implementation options presented to the user may be based on the use case or context of the memory resource.

Figure 21:
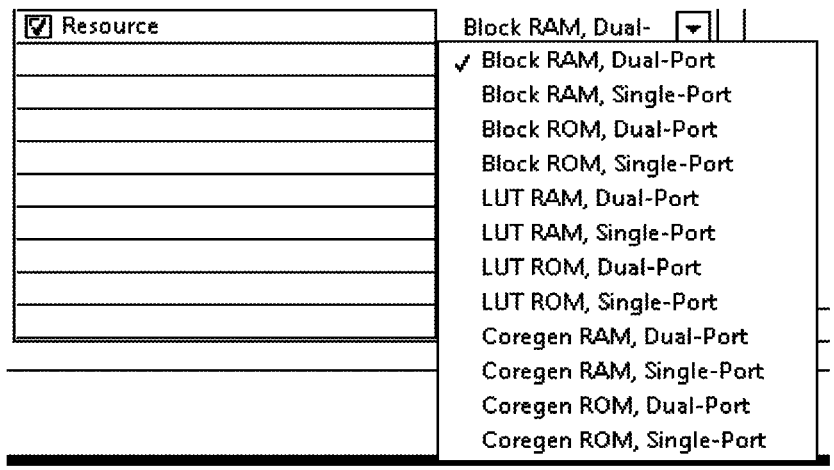
FIG. 21 illustrates selection of an implementation for a memory resource from among selectable options, according to one embodiment.

FIG. 21 illustrates selection of an implementation option for a memory resource from among a display of selectable options, according to one embodiment. As shown, in this example, the user has selected a Block RAM, dual port, implementation for the memory resource.

In other embodiments, the method may automatically specify implementations for some or all of the memory resources used by the graphical program. For example, in some embodiments, specifying an implementation may include automatically (programmatically) selecting a default implementation option, where, it should be noted, the default implementation option can be overridden by user input. For example, in one embodiment, specifying an implementation may include analyzing the at least one memory resource and its use in the graphical program, and programmatically selecting at least one implementation option for the at least one memory resource, based on the analyzing (the at least one memory resource and its use in the graphical program). In some embodiments, the selected implementation option is or includes a directive for hardware implementation of the graphical program.

One example of the application of memory use in programmatically determining memory resource implementation is to determine which arrays in a graphical program should be implemented via block RAM (BRAM), which is a form of a fixed hardware resource on a programmable hardware element. In this exemplary case, the method may specify implementation via BRAM for arrays that meet the following criteria:

a) array is constant (i.e., ROM (Read Only Memory)), or a pass through feedback node with initialization on compile/load and ignoring reset;

b) all accesses of the array occur inside the same loop, across diagrams, or across reentrant or single-instance non-reentrant subVI (graphical subprogram) boundaries;

c) accesses to the array in one clock cycle occur in the following patterns: 2 reads, 1 read, or 1 write after 1 read; and d) there are feedback nodes (registers) placed immediately before a write and after a read operations (on the array) in the graphical program.

Thus, in some embodiments, the method may automatically select which type of memory (e.g., BRAM, DRAM, LUT, etc.) implemented for a node makes the most sense based on the usage pattern, size, or other factors.

In one embodiment, if the user explicitly configures a memory resource to be implemented via a memory type that is not compatible with the usage of the node/memory resource, the method may generate (e.g., and display) an error. Said another way, the method may include analyzing the first memory resource and its use in the graphical program, and in response to determining that the selected first implementation option is incompatible with the use of the first memory resource, indicating an error, e.g., in a display, log file, etc.

In specifying memory resource implementations based on context/usage, the method may determine that one or more memory resources can be shared by nodes, and may specify implementation accordingly, e.g., via a respective directive, possibly overriding previous implementation specifications or directives. In various embodiments, this process may be performed as part of the specification step of the method, or as an optional further optimization step, discussed in more detail below.

For example, consider an exemplary case where a sub program or node called mem.VI has a terminal called Array In, a memory allocation for this terminal has been identified, and a user configures a particular implementation of the memory allocation (e.g., a Look Up Table). Now, a program called top.VI calls the node mem.VI multiple times (meaning that the node appears multiple times in the graphical program) and wires a constant (or array control) to the terminal. The user configures each instance of the constant for a particular implementation, e.g., constant 1 (the first instance) is configured for Block RAM and constant 2 (the second instance) is configured for Flip Flops. The configurations of these constants may override the terminal memory configuration of mem.VI, i.e., mem.VI may "inherit" these configurations and thus override the previously selected configuration.

As another example of programmatic determination of memory resource implementation, multiple memory hardware resources may be specified when a particular programming pattern calls for it. For example, consider a case where an array node receives multiple, e.g., four, indices, and outputs corresponding array values. The method may not be able to determine just a single ROM because there are more than two read accesses (this is a limitation of the specific type of resource ROM). However, the method may determine two ROMs, each with two read accesses which have identical copies of the data contained in the array constant.

Thus, whether with or without user input, configuration information specifying implementation of at least one memory resource for the graphical program may be generated.

In 1912, the configuration information may be stored. The configuration information may then be useable to implement the (functionality of the) graphical program on the programmable hardware element. For example, the configuration information may be used by a synthesis tool to implement memory resources used by the graphical program on the programmable hardware element as specified by the configuration information. The configuration information and the graphical program may then be retrievable, e.g., in response to user input, for provision to a synthesis tool to generate a hardware configuration program for deployment to the programmable hardware element.

In some embodiments, the configuration information may be stored with the directives for the graphical program, e.g., with in the project file (as further directives), although in other embodiments, the configuration information may be stored elsewhere as desired, e.g., with the graphical program itself.

At least a portion of the configuration information may be displayed, thereby allowing the user to review the specified implementations of memory resources for the graphical program.

In some embodiments, the method may include further optimization of the graphical program. For example, in one embodiment, prior to the analysis of the graphical program to determine the one or more memory resources used in the graphical program, or after the implementation specification process, the method may perform one or more transformations, e.g., may apply one or more optimization transforms to the graphical program, e.g., may apply a chain of transforms, to optimize the graphical program. These transforms may include general compilation optimization transforms such as dead code/unused memory elimination and specific transforms for optimizing array implementations on the programmable hardware element (e.g., FPGA). Alternatively, or additionally, further optimization of the graphical program may be performed after specifying a respective implementation for each of the one or more memory resources. The further optimization may include specifying sharing of at least one of the memory resources between nodes in the graphical program, thereby reducing resources required for implementing memory resources on the programmable hardware element.

For example, using the parlance of LabVIEW graphical programs, one specific (exemplary) transform is to isolate array indicators that are not on a connector pane before dead code elimination because these indicators may be useless in the specification process disclosed above. In this way some unnecessary buffers for arrays may be eliminated on the programmable hardware element, thus making the implementation more effective (efficient).

As another example, the method may determine that the lifetimes of two arrays do not have overlap and both arrays have exactly the same data types and length, so that the same buffer can be used for both arrays. Similarly, the method may determine that two arrays have exactly same indexing execution, and so code may be generated to save the two arrays in one memory block on the programmable hardware element, thus reducing the implementations by one memory block.

As a further example, regarding a node that receives two constants as input and outputs another constant, an initial assessment of the required memory resources may indicate the need for three buffers, denoted "a" and "b" (input buffers), and "c" (output buffer). The method may determine that instead of creating three buffers a/b/c, just creating c or a+b may suffice.

Thus, optimization of the graphical program may be performed before and/or after (or even during) the above analysis and specification processes.

In some embodiments, the method may further include receiving user input modifying the graphical program, e.g., based on viewing various results from the above process. For example, such editing of the graphical program may be formed after displaying at least a portion of the configuration information. After this modification of the graphical program, the above-described analyzing, specifying, and displaying, may be performed (e.g., again). Moreover, in some embodiments, the method may include repeating said modifying the graphical program, and said performing said analyzing, said specifying, and said displaying, one or more times in an iterative manner, thereby interactively optimizing resource utilization or performance on the programmable hardware element.

In embodiments that include displaying the graphical program after analyzing the graphical program (including displaying a respective indicator on or proximate to each node displayed in the graphical program that requires a memory resource), user input modifying the graphical program may be received after said displaying the graphical program, and the analyzing, specifying, and displaying, may be performed after said modifying. Additionally, this modifying the graphical program, and performing said analyzing, said specifying, and said displaying, may be repeated one or more times in an iterative manner, thereby interactively optimizing resource utilization or performance on the programmable hardware element.

Similarly, in embodiments that include displaying one or more nodes used in the graphical program that require memory resources, including displaying an indication of each of the one or more memory resources proximate to a respective node of the one or more nodes used in the graphical program that requires the memory resource, user input may be received modifying the graphical program after displaying the one or more nodes and said displaying the graphical program, and the analyzing, specifying, and displaying the one or more nodes, may be performed after such modifying. Moreover, the modifying the graphical program, and performing of the analyzing, specifying, and displaying, may be repeated one or more times in an iterative manner, thereby interactively optimizing resource utilization or performance on the programmable hardware element.

Thus, in some embodiments, the method may include iterative and interactive specification and optimization of the graphical program, particularly regarding the implementation specification of memory resources.

Figure 22:
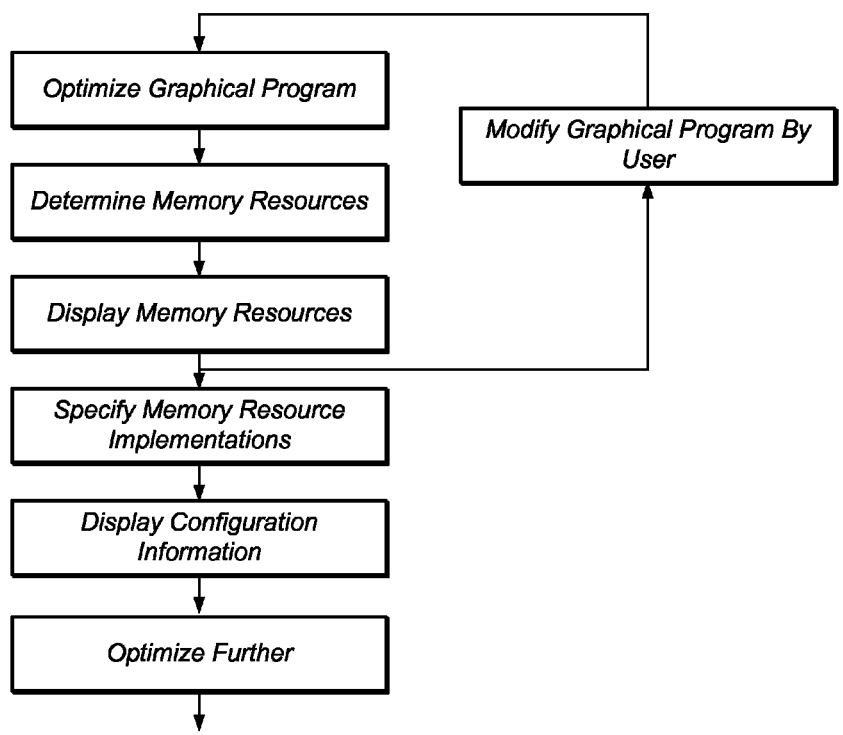
FIG. 22 is a flowchart illustrating one embodiment of a method for iterative interactive specification of hardware implementations for memory resources used by a graphical program.

FIG. 22 illustrates one exemplary embodiment of such an iterative method, where, as may be seen, the method includes optimizing the graphical program, determining memory resources used by the graphical program, displaying the determined memory resources, e.g., in the component display, or in the graphical program display, specifying (or configuring) memory resource implementations, and displaying the configuration information (i.e., the memory resource implementation specifications), after which the user may modify the graphical program. As indicated in the figure, the method then performs the optimizing, determining, displaying memory resources, specifying implementation of the memory resources, displaying configuration information (regarding the memory resource implementations), based on the modified graphical program, and the method may repeat, e.g., with the user making further modifications to the graphical program, and so forth, as shown.

Of course, some of the method elements of FIG. 22 may be optional, as noted above.

Thus, various embodiments of the above techniques may facilitate optimization of the hardware implementation of graphical programs, possibly via interactions with the user.

It should be noted that in various embodiments, any of the features and techniques disclosed above may be used in any combinations desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer implemented method, comprising:
utilizing a computer to perform:
displaying a graphical user interface (GUI), wherein the GUI is configured to receive user input specifying one or more instances of a graphical program for deployment on a programmable hardware element;
receiving user input to the GUI indicating the graphical program;
in response to the user input, displaying via the GUI:
the graphical program, comprising a plurality of interconnected nodes that visually indicate functionality of the graphical program;
one or more nodes of the graphical program, wherein each node of the one or more nodes is configurable in accordance with a directive to generate a respective hardware implementation of the node;
one or more directives, wherein each directive specifies one or more requirements for a hardware implementation of the graphical program, wherein each directive of the one or more directives is selectable for application to a specific type of node in the graphical program;

receiving user input selecting a set of directives for the graphical program;

in response to the user input selecting the set of directives for the graphical program, displaying via the GUI:

estimated results generated by a synthesis tool in accordance with the set of selected directives; and storing the set of selected directives in association with the graphical program, wherein the graphical program and the selected set of directives are useable by the synthesis tool to generate a hardware configuration program that is deployable to the programmable hardware element.

2. A non-transitory computer accessible memory medium comprising program instructions executable by a processor to implement a graphical user interface (GUI) for specifying implementation directives of a graphical program for deployment on a programmable hardware element, wherein the GUI is configured to:

receive user input indicating the graphical program;

in response to the user input, display via the GUI:

the graphical program, wherein the graphical program comprises a plurality of interconnected nodes that visually indicate functionality of the graphical program;

one or more nodes of the graphical program, wherein each node of the one or more nodes is configurable in accordance with a directive to generate a respective hardware implementation of the node;

one or more directives, wherein each directive specifies one or more requirements for a hardware implementation of the graphical program, wherein each directive of the one or more directives is selectable for application to a specific type of node in the graphical program;

receive user input selecting a set of directives for the graphical program;

in response to the user input selecting the set of directives for the graphical program, display via the GUI:

estimated results generated by a synthesis tool in accordance with the set of selected directives; and store the set of selected directives in association with the graphical program, wherein the graphical program and the selected set of directives are useable by the synthesis tool to generate a hardware configuration program that is deployable to the programmable hardware element.

3. The non-transitory computer accessible memory medium of claim 2, wherein each directive comprises a descriptive directive textually indicative of its meaning.

4. The non-transitory computer accessible memory medium of claim 2, wherein the GUI is further configured to display two or more selectable suites of directives, wherein each suite of directives comprises multiple directives and specifies a respective level of optimization to be applied to the graphical program.

5. The non-transitory computer accessible memory medium of claim 4, wherein the GUI is further configured to automatically select at least one directive or suite of directives by default, wherein any of the automatically selected directives or suites of directives can be overridden by user input.

6. The non-transitory computer accessible memory medium of claim 4, wherein the GUI is further configured to:

receive user input selecting at least one suite of the two or more selectable suites of directives;

wherein the set of selected directives comprises the selected at least one suite.

7. The non-transitory computer accessible memory medium of claim 2, wherein the GUI is further configured to:

receive user input selecting a first node of the one or more nodes; and highlight the selected first node.

8. The non-transitory computer accessible memory medium of claim 7, wherein the GUI is further configured to:

display all and only directives applicable to the first node, in response to the user input selecting the first node.

9. The non-transitory computer accessible memory medium of claim 8, wherein the GUI is further configured to:

receive user input selecting at least one directive for application to the first node of the one or more nodes;

wherein the set of selected directives comprises the at least one directive selected by the user.

10. The non-transitory computer accessible memory medium of claim 9, wherein the GUI is further configured to:

receive further user input selecting another node of the one or more nodes;

display all and only directives applicable to the other node, in response to the user input selecting the other node;

receive further user input selecting another at least one directive for application to the other node, wherein the set of selected directives comprises the another at least one directive; and repeating said further user input selecting another node, said displaying all and only directives applicable to the other node, said receiving further user input selecting another at least one directive for application to the other node, one or more times in an iterative manner;

wherein the set of selected directives comprises each of the other at least one directives selected by the user.

11. The non-transitory computer accessible memory medium of claim 7, wherein the GUI is further configured to:

highlight the selected first node in the display of the graphical program.

12. The non-transitory computer accessible memory medium of claim 2, wherein the estimated results comprise one or more of:

a summary of estimated results;

estimated device utilization; or estimated performance.

13. The non-transitory computer accessible memory medium of claim 12, wherein to display the estimated results, the GUI is further configured to display applied directives that are related to respective ones of the estimated results.

14. The non-transitory computer accessible memory medium of claim 12, wherein to display the estimated results, the GUI is configured to display nodes of the graphical program that are related to respective ones of the estimated results.

15. The non-transitory computer accessible memory medium of claim 2, wherein the GUI is further configured to retrieve the set of selected directives and the graphical program in response to user input for provision to the synthesis tool to generate the hardware configuration program.

16. The non-transitory computer accessible memory medium of claim 2, wherein the one or more nodes of the graphical program are displayed in a tree diagram.

17. The non-transitory computer accessible memory medium of claim 2, wherein respective portions of the GUI are accessible via a tabbed window of the GUI.

18. The non-transitory computer accessible memory medium of claim 17, wherein the GUI is implemented as a tabbed window, wherein portions of the GUI are accessible via respective tabs.

19. The non-transitory computer accessible memory medium of claim 18,
- wherein the user input is received via a first portion of the GUI, wherein the first portion of the GUI is accessible via a first tab;
- wherein the graphical program, the one or more nodes of the graphical program, and the one or more directives are displayed in a second portion of the GUI, wherein the second portion of the GUI is accessible via a second tab; and
- wherein the estimated results are displayed in a third portion of the GUI, wherein the third portion of the GUI is accessible via a third tab.

20. The non-transitory computer accessible memory medium of claim 2, wherein the graphical program comprises a graphical data flow program.

21. The non-transitory computer accessible memory medium of claim 2, wherein the programmable hardware element comprises one or more field programmable gate arrays.

22. The non-transitory computer accessible memory medium of claim 2, wherein the GUI is coupled to or comprised in a graphical program development environment, and wherein the GUI is further configured to:
- receive user input selecting the set of descriptive directives or another set of descriptive directives from among a plurality of selectable sets of descriptive directives;
- display the graphical program overlaid with indicators of the descriptive directives of the selected set of descriptive directives.

23. The non-transitory computer accessible memory medium of claim 22, wherein the GUI is further configured to:
- receive user input to the displayed graphical program selecting an indicator of a descriptive directive;
- receive third user input editing the descriptive directive, thereby modifying the descriptive directive; and
- storing the modified descriptive directive.

* * * * *